United States Patent
Kobayashi et al.

(10) Patent No.: US 6,517,974 B1
(45) Date of Patent: Feb. 11, 2003

(54) LITHIUM SECONDARY BATTERY AND METHOD OF MANUFACTURING THE LITHIUM SECONDARY BATTERY

(75) Inventors: Naoya Kobayashi; Soichiro Kawakami; Tomoya Yamamoto, all of Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,922

(22) Filed: Jan. 27, 1999

(30) Foreign Application Priority Data

Jan. 30, 1998 (JP) .......................................... 10-018931

(51) Int. Cl.[7] .............................................. H01M 4/58
(52) U.S. Cl. .................. 429/231.95; 429/221; 429/223; 429/224
(58) Field of Search ................................ 429/223, 224, 429/221, 231.3, 231.95

(56) References Cited

U.S. PATENT DOCUMENTS

| | | | |
|---|---|---|---|
| 5,426,006 A | * 6/1995 | Delnick et al. | 429/218 |
| 5,451,477 A | * 9/1995 | Omaru et al. | 429/218 |
| 5,478,672 A | * 12/1995 | Mitate | 429/194 |
| 5,503,930 A | * 4/1996 | Maryama et al. | 428/402 |
| 5,601,952 A | * 2/1997 | Dasgupta et al. | 429/224 |
| 5,869,208 A | * 2/1999 | Miyasaka | 429/224 |
| 5,882,821 A | * 3/1999 | Miyasaka | 429/224 |
| 5,911,920 A | * 6/1999 | Hasezaki et al. | 252/518.1 |
| 5,993,998 A | * 11/1999 | Yasuda | 429/231.95 |
| 6,004,695 A | * 12/1999 | Goda et al. | 429/218.1 |
| 6,033,807 A | * 3/2000 | Yasuda | 429/231.95 |
| 6,037,095 A | * 3/2000 | Miyasaka | 429/218.1 |

FOREIGN PATENT DOCUMENTS

| | | |
|---|---|---|
| DE | 198 34 243 | 2/1999 |
| EP | 0 814 523 | 12/1997 |
| EP | 280111 A2 * | 1/1998 |
| EP | 0 820 111 | 1/1998 |
| EP | 0 844 680 | 5/1998 |
| EP | 844680 A1 * | 5/1998 |
| EP | 938147 A2 * | 8/1999 |
| FR | 2 725 709 | 4/1996 |
| JP | 62-122066 | 6/1987 |
| JP | 63-114057 | 5/1988 |
| JP | 5-47381 | 2/1993 |
| JP | 5-190171 | 7/1993 |
| JP | 5-234585 | 9/1993 |
| JP | 11283627 A * | 10/1999 |

OTHER PUBLICATIONS

F. Salver–Disma et al., "Unique effect of mechanical milling on the lithium intercalation properties of different carbons", Solid State Ionics, vol. 98, pp. 145–158 (1997).

Patent Abstracts of Japan, vol. 1999, No. 03, Mar. 31, 1999 (corresponds to JP 10–321225).

Patent Abstracts of Japan, vol. 015, No. 479 (E–1141), Dec. 5, 1991 (corresponds to JP 03–208256).

* cited by examiner

*Primary Examiner*—Tom Dunn
*Assistant Examiner*—Colleen P. Cooke
(74) *Attorney, Agent, or Firm*—Fitzpatrick, Cella, Harper & Scinto

(57) ABSTRACT

A lithium secondary battery comprising at least a negative electrode, a positive electrode and an electrolyte, and utilizing oxidizing and reducing reactions of lithium ions for charging and discharging, wherein an electrode having an active material which has at least an amorphous phase and a half value width not smaller than 0.48 degrees of a peak having a highest diffraction intensity at 2θ on an X-ray diffractometric chart traced at a diffraction intensity at an X-ray diffraction angle of 2θ, and is made of a material which has an amorphous phase and contains at least one element selected from among cobalt, nickel, manganese and iron is used as the negative electrode and/or the positive electrode.

9 Claims, 11 Drawing Sheets

LITHIUM SECONDARY BATTERY AND METHOD OF MANUFACTURING THE LITHIUM SECONDARY BATTERY

BACKGROUND OF THE INVENTION

1. Field of the Invention

The present invention relates to a lithium secondary battery and a method of manufacturing the lithium secondary battery, and more particularly to a lithium secondary battery which prevents the increases in electrode impedance resulting from expansion and contraction of electrode active material due to repeated charging and discharging, and to a method of manufacturing this lithium secondary battery. The present invention also relates to a high energy-density lithium secondary battery having increased sites in which lithium ion can be intercalated and de-intercalated, the increased sites increasing the capacity of positive electrode and negative electrode.

2. Related Background Art

Recently, it has been said that increasing $CO_2$ gas contained in air exhibits green house effect to cause global warming. Thermal power plants use fossil fuel to convert thermal energy into electric energy. Accordingly, a large amount of $CO_2$ gas is exhausted, being a barrier in building additional thermal power plants. Therefore, so-called load leveling has been proposed for effective use of electric power generated in the thermal power plants. That is, electric power generated in the night is stored in storage batteries at consumer's homes and the stored electric power is used in the daytime during when electric power consumption increases, thereby leveling load distribution.

For electric vehicles having a feature where substances containing $CO_x$, $NO_x$, and CH that contaminate air are not exhausted, the development of a high energy-density secondary battery has been demanded. In addition, the development of small size, lighter weight, high performance secondary batteries is urgently demanded which find applications in portable equipment such as book size personal computers, word processors, video cameras, and mobile telephones.

After JOURNAL OF THE ELECTROCHEMICAL SOCIETY 117, 222 (1970) has reported an application of graphite intercalation compound for a negative electrode of a lighter weight, smaller size secondary battery, a rocking chair type secondary battery referred to as a lithium ion battery has been developed and some have been put in practical use. This type of secondary battery uses a carbon material for a negative active material, and an intercalation compound containing lithium ion for positive active material. With this lithium ion battery, the negative electrode is formed of a host material in the form of a carbon material that allows lithium ions as a guest material to be intercalated. The use of such a material suppresses dendrite growth of lithium during the charging of the battery, thereby allowing more number of charging/discharging cycles in the useable life of the battery.

Since the aforementioned lithium ion battery achieves a long-life secondary battery, proposal and research are carried out vigorously in an attempt to apply various carbon materials to the negative electrode. Japanese Patent Application Laid-Open No. 62-122066 proposes a secondary battery using a carbon material where an atomic ratio hydrogen/carbon is less than 0.15, the distance between (002) planes is 0.337 nm or longer, and the crystallite size in c-axis is 15 nm or less. Japanese Patent Application Laid-Open No. 63-217295 proposes a secondary battery using a carbon material where the distance between (002) planes is 0.370 nm or longer, true density is less than 1.70 g/ml, and a peak value of heat generated is 700° C. or higher when subjected to differential thermal analysis in flowing air. There are some research reports on the application of various carbon materials to negative electrode. Carbon fibers are reported in Electrochemical Society Vol. 57, p.614 (1989). Natural graphite is reported in the Proceedings of the 33rd Battery Symposium, Mesofuse microsphere and graphite whisker are reported in the Proceedings of the 34th Battery Symposium, p.77 (1993) and p.77, respectively. Burned furfuryl alcohol resin is reported in the Proceedings of the 58th Conference of the Electrochemical Society of Japan p.158 (1991).

However, with a lithium ion battery which uses a carbon material containing lithium as a negative electrode active material therein, there has been developed no battery whose discharge capacity exceeds the theoretical value of the graphite intercalation compound, the discharge capacity being such that a stable electric power can be drawn from the battery when the battery is used through repeated charging and discharging. That is, the theoretical value is such that a carbon intercalation compound can store one lithium atom for every six carbon atoms. Thus, a lithium ion battery using a carbon material as a negative active material has a long cycle-life but not as large an energy density as a lithium battery that directly uses metal lithium as a negative active material. If the negative electrode of a lithium ion battery formed of a carbon material is to be intercalated with lithium of an amount larger than the theoretical capacity during charging cycle, lithium metal grows in a dendrite pattern on the surface of the negative electrode formed of a carbon material, ultimately causing an internal shorting out between the negative electrode and positive electrode due to repeated charging and discharging cycles. A lithium ion battery with the theoretical capacity of a graphite negative electrode has not a long enough cycle life for practical use.

On the other hand, a high capacity lithium secondary battery that uses metal lithium for negative electrode has been demanded but not put in practical use yet. Because the charging/discharging cycle life is very short. This short cycle life is considered to be primarily due to the fact that metal lithium reacts with impurities such as moisture contained in the electrolyte to form an insulating film on the electrodes and therefore repeated charging and discharging causes lithium to grow in a dendrite pattern, resulting in an internal shorting out between the negative and positive. This leads to the end of the battery life.

If a dendrite pattern of lithium grows to short-circuit negative electrode and positive electrode, the energy stored in the battery is consumed in a short time so that heat is generated and the solvents of the electrolyte are decomposed to generate gas to increase internal pressure, thereby damaging the battery.

In order to alleviate the problem of metal lithium negative electrode that a metal lithium reacts with the moisture and organic solvents contained in the electrolyte, use of a lithium alloy containing lithium and aluminum also has been proposed. However, use of a lithium alloy is not currently in practical use due to the following problems. A lithium alloy is too hard to be wound in a spiral form, and therefore a spiral cylindrical battery cannot be made. The charging/discharging cycle life is not prolonged as much as one expects. A battery using a lithium alloy for negative electrode does not provide as much energy density as a battery using metal lithium.

Japanese Patent Application Laid-Open Nos. 5-190171, 5-47381, 63-114057, and 63-13264 have proposed the use of various forms of lithium for negative electrode. Japanese Patent Application Laid-Open No. 5-234585 proposes the application of metal power on the surface of lithium, the metal powder preventing lithium from producing various kinds of intermetallic compounds. None of the proposals in the aforementioned publications can be a decisive answer that prominently prolongs the life of the negative electrode.

JOURNAL OF APPLIED ELECTROCHEMISTRY 22 (1992) 620 to 627 reports a high energy density lithium secondary battery using an aluminum foil for negative electrode, the lithium secondary battery having an energy density lower than a lithium primary battery. When this lithium secondary battery is subjected to as many charging/discharging cycles as practical, the aluminum foil experiences expansion and contraction repeatedly till the aluminum foil is finally cracked, leading to reduced current collection and dendrite growth. Thus, a secondary battery having a practically long life has not been developed yet.

For these reasons, there is a strong demand on the development of material for the negative electrode which has a longer life and a higher energy density than the negative electrode of carbon currently in practical use.

In order to implement a high energy-density lithium secondary battery, the development of materials for not only negative electrode but for positive electrode are necessary. At present, a lithium-transition metal oxide is most commonly used as an active material for a positive electrode, the lithium-transition metal oxide having lithium ion inserted (intercalated) in an intercalation compound. However, the lithium-transition metal oxide can achieve a discharge capacity of only about 40 to 60% of the theoretical capacity. In particular, in order for a battery to be a practical battery having a long charging/discharging cycle life, the charging/discharging capacity should be as low as possible. This is detrimental to the implement of high capacity battery. For example, the 34th Battery Symposium 2A04 (pp.39–40) reports that when the cobalt acid lithium is charged so that lithium is de-intercalated more than ¾ of the theoretical capacity, the crystal structure of the cobalt acid lithium changes from single crystal to hexagonal system. The c-axis extremely shrinks during the intercalation with the result that the reversibility of lithium becomes extremely deteriorated from the next discharge onward. Thus, charging/discharging cycle property deteriorates. This is true of, for example, nickel acid lithium.

In order to suppress changes in crystal structure, for example, the 34th Battery Symposium 2A08 (pp.47–48) proposes that a portion of lithium contained in cobalt acid lithium is substituted by sodium, potassium, copper, and silver. Adding cobalt, manganese, aluminum or the like to nickel acid lithium also has been reported. However, these proposals are not enough for improving the utilizing efficiency and charging/discharging cycle characteristic.

As mentioned above, with a lithium secondary battery, including a lithium ion battery, which uses lithium ion as a guest material for charging/discharging reaction, there have been strong demands for the development of negative and positive polarities having a practical life, the negative and positive polarities having a higher capacity than a negative electrode of a carbon material and a positive electrode of a transition metal oxide which have currently used.

SUMMARY OF THE INVENTION

The present invention was made in view of the aforementioned problems.

An object of the invention is to provide a method of manufacturing a lithium secondary battery which uses oxidization and reduction of lithium ion, the secondary battery having a positive electrode formed of a high capacity positive electrode active material and a negative electrode formed of a high capacity negative electrode active material.

Another object of the invention is to provide a lithium secondary battery including at least negative electrode, positive electrode and electrolyte, and using the oxidization and reduction of lithium ion, the negative and/or positive polarities being formed of an active material having at least an amorphous phase. (a) The composition of the active material is a material which has at least an amorphous phase and contains at least one of cobalt, nickel, manganese, and iron that have an amorphous phase. The active material having a half value width not less than 0.48 degrees, the half value width being a diffraction angle that half a peak value of the highest of diffraction intensity appearing on an X-ray diffraction chart. The diffraction intensity is plotted against X-ray diffraction angle (2θ).

Another object of the invention is to provide a lithium secondary battery including at least negative electrode, positive electrode, and electrolyte, and using the oxidization and reduction of lithium ion, wherein (b) the negative electrode is made of an active material having at least an amorphous phase and a half value width not less than 0.48 degrees, the half value width being a diffraction angle that half a peak value of the highest of diffraction intensity occupies. The diffraction intensity appears on an X-ray diffraction chart in which diffraction intensity is plotted against X-ray diffraction angle (2θ). The active material is a composite material of an amorphous material and a second material, the amorphous material having an amorphous portion and the second material containing at least one of carbon and metal elements which have an amorphous phase and are electrochemically inert to substances other than lithium during the charging/discharging reaction of the lithium battery.

The present invention provides a method of manufacturing a lithium secondary battery characterized in that an amorphous material is prepared by giving physical energy to a crystalline material, and the amorphous material is used as a positive active material to form a positive electrode and/or as a negative active material to form a negative electrode.

In the present invention, the term "active material" is used to cover substances that contribute to the electrochemical reaction (repeated reaction) of charging and discharging a battery.

The present invention provides a lithium secondary battery which includes at least a negative electrode, a positive electrode, and an electrolyte, and uses the oxidization and reduction of lithium ion. Electrodes are formed of active materials having at least an amorphous phase, wherein the active material is a compound having an amorphous phase and containing at least one or more elements selected from cobalt, nickel, manganese, and iron. The active material has a half value width not less than 0.48 degrees, the half value width being a diffraction angle that half a peak value of the highest of diffraction intensity occupies. The diffraction intensity appears on an X-ray diffraction chart in which diffraction intensity is plotted against X-ray diffraction angle (2θ).

DETAILED DESCRIPTION OF THE PREFERRED EMBODIMENTS

Figure 1A:
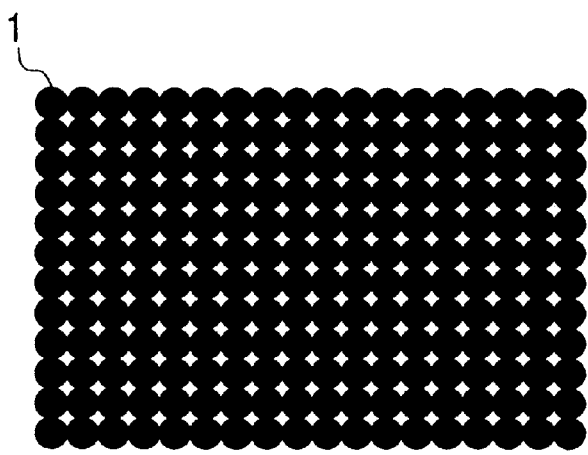
FIGS. 1A, 1B and 1C are model representation illustrating phases of a starting material which varies from crystalline phase to amorphous phase according to the manufacturing method of the invention.

Embodiments of first and second lithium secondary batteries according to the present invention are grouped in terms of specific combination of electrodes as follows:

(1) A lithium secondary battery having an electrode (referred to as "Electrode (a)" hereinafter) formed of an active material with at least an amorphous phase, wherein the active material is a compound having an amorphous phase and contains at least one or more of cobalt, nickel, manganese, and iron. The active material having a half value width not less than 0.48 degrees, the half value width being a diffraction angle that half a peak value of the highest of diffraction intensity appearing on an X-ray diffraction chart. The diffraction intensity is plotted against X-ray diffraction angle (2θ). The lithium secondary battery has a positive electrode formed of the aforementioned Electrode (a).

(2) A lithium secondary battery using Electrode (a) of Group (1) for a negative electrode.

(3) A lithium secondary battery using Electrode (a) of Group (1) for positive and negative electrodes, the positive and negative electrodes having different compositions of active material.

(4) A lithium secondary battery having an electrode (referred to as "Electrode (b)" hereinafter) made of an active material with at least an amorphous phase and a half value width not less than 0.48 degrees, the half value width being a diffraction angle that half a peak value of the highest of diffraction intensity occupies. The diffraction intensity appears on an X-ray diffraction chart in which diffraction intensity is plotted against X-ray diffraction angle (2θ), The active material is a composite material containing a material at least one of carbon and amorphous phase metal elements, and a material being electrochemically inert to substances other than lithium during the charging/discharging reaction of the lithium battery. The lithium secondary battery has a negative electrode formed of the aforementioned Electrode (b).

(5) A lithium secondary battery having a positive electrode formed of Electrode (a) described in Group (1) and a negative electrode formed of Electrode (b) described in Group (4).

The electrodes (a) and (b) described in item (1) and (4) will now be described in detail.

The electrode (a) has an active material with the aforementioned X-ray diffraction characteristic and an amorphous phase. The active material includes one or more of cobalt, nickel, manganese, and iron. Electrode (a) is thus used to form a positive electrode and/or a negative electrode in Groups (1), (2), (3), and (5). An amorphous material that constitutes the active material is obtained by forming a crystalline starting substance (parent material) into an amorphous phase, the material preferably having reversibility with respect to the charging/discharging reactions of a lithium battery, i.e., causing oxidization/reduction reactions, and containing at least one or more of cobalt, nickel, manganese, and iron. When such an active material is used for a positive electrode or a negative electrode, the active material functions as a high capacity positive active material or a negative active material since the active material includes increased sites in which lithium ion can be intercalated and de-intercalated.

When forming a crystalline material containing one or more of cobalt, nickel, manganese, and iron into an amorphous phase, it is preferable to simultaneously add materials to form a composite product: the first material is such that an electrode made of the material becomes electrochemically inert during the charging/discharging reactions of the lithium battery, and the second material is such that an electrode made of the material becomes electrochemically inert to substances other than lithium during the charging/discharging reactions of the lithium battery. A resultant compound (composite material) is a product where the aforementioned materials that become electrochemically inert material reacts on the surface of a crystalline material (starting substance), so that crystal portion of the crystalline material is converted into a different phase, i.e., an amorphous phase, in which the arrangement of atoms is irregular. In some cases, it is presumed that materials that become electrochemically inert react with amorphous material to be diffused into the amorphous material.

The aforementioned method of forming a composite material has the following advantages.

(1) The crystalline material is rapidly formed into an amorphous phase.

(2) The site increases where the resultant amorphous composite material is intercalated and de-intercalated with lithium ion.

(3) The use of an electrically conductive material as the aforementioned material that becomes electrochemically inert is advantageous in that the electrochemically inert material of a resultant amorphous composite material covers around the particles of materials (cobalt, nickel, manganese, and iron) which has reversibility for a lithium secondary battery. Thus, the electrical conductivity of the reversible material for lithium secondary battery is improved.

The crystalline starting materials that are formed into a material having an amorphous phase and used to form Electrode (a) are those that contain one or more of cobalt, nickel, manganese, and iron (also include these metals alone). The starting materials are preferably transition metal compounds into which lithium ion can be electrochemically inserted or from which lithium ion can be electrochemically removed, and more preferably the oxides, nitrides, sulfides, or hydroxides, peroxides of transition metals, or the oxides, nitrides, sulfides, or hydroxides, peroxides of transition metals containing lithium. Also, oxides or peroxides of the above-described transition metal containing allcaline metal except for lithium, and the oxides and peroxides of the transition metal containing the lithium. The compounds of cobalt, nickel, manganese, and iron exhibit high voltages on the order of 4 V. Thus, a secondary battery provides a high energy density, the battery using electrodes formed of active material which contains these compounds as essential compositions. The compounds of cobalt, nickel, manganese, and iron are advantageous in that they retain reversibility throughout repeated charging/discharging cycles, thus offering long life electrodes.

In addition to cobalt, nickel, manganese, and iron, transition metal elements such as those partially having a d-shell or an f-shell, i.e., Sc, Y, lanthanoids, actinoid, Ti, Zr, Hf, V, Nb, Ta, Cr, Mo, W, Tc, Re, Fe, Ru, Os, Rh, Ir, Pd, Pt, Cu, Ag, and Au. The resultant amorphous material is selectively used as an active material for a positive electrode or a negative electrode depending on the composition of material. Especially materials obtained from materials composed only of the above elements of cobalt, nickel, manganese, and iron.

A material having an amorphous phase, which is obtained from a crystalline material containing one or more of cobalt, nickel, manganese, and iron is formed together with a second material into a composite material to be used as an active material. The second material is such that an electrode formed of the active material becomes electrochemically inert to materials other than lithium during the charging/discharging of a lithium battery. The material for the active material may have an element(s) and composition which are different from the aforementioned material having an amorphous phase, which is obtained from a crystalline material containing one or more of cobalt, nickel, manganese, and iron.

The material that becomes electrochemically inert is such that when a battery (or electrode) is subjected to charging/discharging (oxidization/reduction), an electrode formed of the material, (1) does not react (intercalate/de-intercalate) with lithium ion, (2) does not react with electrolyte, (3) does not change into other substance, that is, an added metal is not oxidized. In other words, added metal does nothing (no reaction other than the intercalation and de-intercalation of lithium during the charging and discharging cycles).

The materials that become electrochemically inert during the charging and discharging of a lithium battery are those that meet all of the above-described conditions (1) to (3). The material that becomes eletrochemically inert to substances other than lithium during the charging/discharging of a lithium battery are those that meet the conditions (2) and (3) but the condition (1). The aforementioned two types of materials are selectively used taking into account the relation between the potential and the materials of an electrode and a counterelectrode. Electrode (a) is used for a positive electrode, which Electrode (a) is formed of an active material. The active material is a product when a material that contains one or more of cobalt, nickel, manganese, and iron is formed together with a second material for an active material into a composite material, the material for the active material becoming electrochemically inert to materials other than lithium during charging/discharging of a lithium battery.

Electrode (a) is used for a negative electrode. Electrode (a) is formed of an active material which is a product when a material in the form of one or more of cobalt, nickel, manganese, iron is formed together with a second material into a composite material. The second material for the active material becomes electrochemically inert to materials other than lithium during the charging/discharging of a lithium battery.

A material having a high electrical conductivity is a desirable material for an electrode formed of the active material that becomes electrochemically inert during the charging and discharging reaction of the aforementioned lithium secondary battery, or for an electrode of the active material that becomes electrochemically inert to substances other than lithium during the charging and discharging reaction of the aforementioned lithium secondary battery. In addition, the desirable material does not react with the electrolyte during the charging and discharging or does not dissolve in the electrolyte.

Materials having a less noble standard electrode potentials are desirable materials for a positive electrode formed of the active material containing a metal material that becomes electrochemically inert during the charging and discharging reaction of the aforementioned lithium secondary battery. Desirable metal materials include magnesium, aluminum, manganese, zinc, chrome, iron, cadmium, cobalt, nickel, and various kinds of alloys and composite metals of two or more of these metal elements. These materials are selected taking the material (active material) for a counterelectrode into account.

A material having a noble standard electrode potential is a desirable material for a negative electrode formed of the active material that becomes electrochemically inert to substances other than lithium during the charging and discharging reaction of the aforementioned lithium secondary battery. Desirable metal materials include cobalt, nickel, tin, lead, platinum, silver, copper, gold, and various kinds of alloys and composite metals of two or more of these elements. These metal materials are selected taking the material (active material) for a counterelectrode into account.

A material for a positive electrode, formed of the active material that becomes electrochemically inert during the charging and discharging reaction of the aforementioned lithium secondary battery, is, for example, amorphous carbon including ketjen black and acetylene black, natural graphite, or artificial graphite such as hardly-graphitized carbon or the like and easily-graphitized carbon or the like. These materials are selected taking the material (active material) for a counterelectrode into account. Carbon blacks such as acetylene black has primary particles of small diameters on the order of sub-microns, and is therefore suitable for covering the surface of the active material. On the other hand, when graphite is formed into a composite material using at least one of cobalt, nickel, manganese, and iron, the material is subjected to mechanical grinding. A graphite particle having a large diameter is heavy, and therefore provides larger energy than carbon black so that mechanical grinding can be smoothly effected. Thus, such a carbon is desirable.

A carbon material for a negative electrode, formed of the active material that becomes electrochemically inert to substances other than lithium during the charging and discharging reaction of the aforementioned lithium secondary battery, includes an amorphous carbon including carbon black such as ketjen black and acetylene black, natural graphite, or artificial graphite such as hardly-graphitized carbon or the like and easily-graphitized carbon or the like. These carbon materials may be selected taking the material (active material) for a counterelectrode into account.

Transition metal compounds are desirable metal-containing compounds that serve as an active material of which a positive electrode of a lithium secondary battery is formed, the active material becoming electrochemically inert to substances other than lithium during the charging and discharging reaction of the aforementioned lithium secondary battery. Specifically, nitrates, acetates, halide salts, sulfates, organic acid salts, oxides, nitrides, sulfides, thiocarbonates, hydroxides, alkoxides, etc. of transition metals can be employed. The transition metals include elements partially having d-shell or f-shell, that is, Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Particularly preferred elements are primary transistion metals such as Ti, V, Cr, Mn, Fe, Co, Ni, and Cu. These transition metal compounds are selected taking a material (active material) for a counterelectrode into account.

Metal-containing compounds that have electrochemically less noble potentials are desirable materials for a negative electrode of a lithium secondary battery, the material becoming electrochemically inert to substances other than lithium during the charging and discharging reaction of the lithium secondary battery.

This is because a material used for negative electrode can be reversibly intercalated and de-intercalated as long as the material has an electrochemically less noble potential with respect to a positive potential, i.e., the electrode potential is close to that of the positive electrode. The compounds include sulfides, oxides, nitrides, etc., of titanium containing or not containing lithium, copper, vanadium, molybdenum, and iron. These material are selected taking a material (active material) for a counterelectrode into account.

Electrode (b) has an active material which is a composite material of two materials: the first is a material that contains at least one or more of carbon and metal elements having an amorphous phase and the aforementioned properties determined by X-ray diffraction method, and the second is a material as an active material of which an electrode is formed, the active material becoming inert to materials other than lithium during the charging and discharging of a lithium battery.

Electrode (b) is applied to the negative electrode of a lithium secondary battery in Groups (4) or (5). Preferred composite materials as an active material are made by simultaneously adding a crystalline material containing at least one or more of carbon and metal elements to a second material that becomes electrochemically inert to substances other than lithium during the charging/discharging. Just as in Electrode (a), the ultimately obtained amorphous phase composite material is a material such that an electrochemically inert material reacts on the surface of a crystalline material (starting material) so that a part of the crystalline material is formed into other state, i.e., amorphous phase where atomic arrangement is irregular.

The aforementioned method of forming a composite material has the following advantages.

(1) The crystalline material is rapidly formed into an amorphous phase.

(2) The site increases where the resultant amorphous material (composite material) is intercalated and de-intercalated with lithium ion.

(3) Using an electrically conductive material as the aforementioned material that becomes electrochemically inert is advantageous in that the resultant amorphous compound (composite material) increases electrical conductivity of a reversible material used for lithium secondary battery.

Electrode (b) is used for a negative electrode formed of an active material, which is a composite material containing a material that becomes electrochemically inert to substances other than lithium during the charging and discharging reaction of a lithium battery. Thus, unwanted oxides and decomposition of the active material during the battery reaction are suppressed, ensuring charging and discharging with good performance.

Preferred crystalline starting materials for obtaining an amorphous-phase composite material that is used for Electrode (b) include carbon materials into which lithium ion can be electrochemically inserted or from which lithium ion can be electrochemically removed, the metals that can form an alloy with lithium during electrochemical reaction, metals that cannot form an alloy with lithium during electrochemical reaction, and compounds (metal material) into which lithium can be intercalated and from which lithium can be de-intercalated.

Specific examples of the carbon materials include carbons having graphite skeletal structure such as natural graphite, hardly-graphitized carbon, easily-graphitized carbon, artificial graphite, and graphite skeletal structure. Metals that can form an alloy with lithium. Metals that can form alloys with lithium during electrochemical reaction include, for example, Al, Mg, Pb, K, Na, Ca, Sr, Ba, Si, Ge, Sn, and In. Metals that do not form alloys with lithium during electrochemical reaction include, for example, Ni, Co, Ti, Cu, Ag, Au, W, Mo, Fe, Pt, and Cr. Compounds that can be intercalated and de-intercalated include the oxides, nitrides, hydroxides, sulfides, and sulfate of the aforementioned metals, specific example being lithium-titanium oxide, lithium-cobalt nitride (Li3-xCoxN), and lithium-cobalt vanadium oxide.

Electrode (b) is formed of an active material that becomes electrochemically inert to substances other than lithium during the charging/discharging reactions of a lithium battery, the active material being a composite material having an amorphous phase. The materials used for making the composite material are those that have elements and compositions different from the crystalline starting material and that become electrochemically inert to substances other than lithium, the substances being used as an active material for Electrode (a). The materials used for the composite material are appropriately selected taking the potential of the material for a counterelectrode into account.

In particular, if Electrode (b) is formed of a material that becomes electrochemically inert to substances other than lithium and can reversibly intercalate and de-intercalate lithium ion, then such a material can perform charging and discharging independently of the active material. Thus, a composite material in an amorphous phase can be obtained while still maintaining charging/discharging capacity. One example, is a composite material of crystalline natural graphite and tin that is electrochemically inert to substances other than lithium.

The mechanism of charging and discharging of the active materials used for Electrode (a) and Electrode (b) of a lithium secondary battery will now be described in detail with reference to the accompanying drawings.

For example, crystallized active materials (intercalation compound) are of a crystal structure where atoms 1 are regularly arranged in the crystal lattice as shown in FIG. 1A.

Therefore lithium ion is intercalated (when the battery discharges) regularly between layers formed of the atoms of the active material which acts as a host material.

Figure 1B:
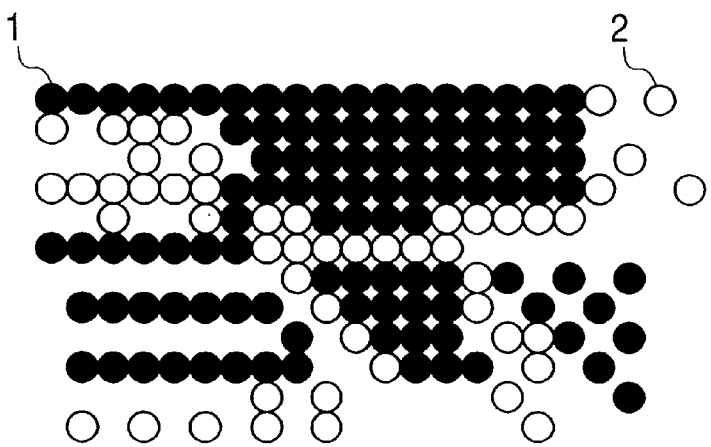
Figure 1C:
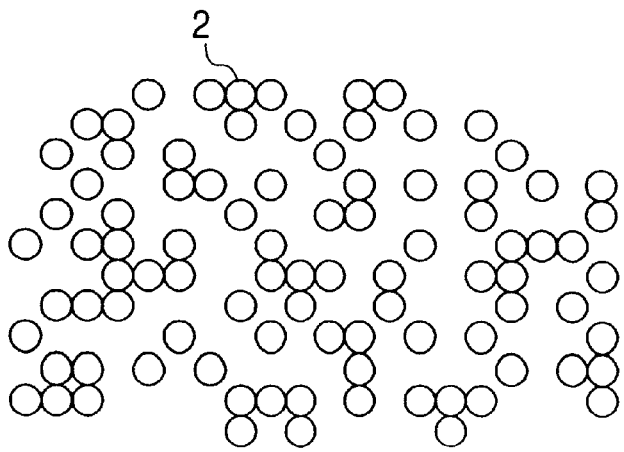

For an active material for Electrode (a) or Electrode (b), obtained by giving physical energy to a crystallized active material to form the crystallized active material into an amorphous active material, the atomic arrangement 2 of the active material, i.e., a host material, changes from that of FIG. 1B to an irregular arrangement of FIG. 1C. This increases site in which lithium ion is intercalated.

As for an active material for positive electrode, if the intercalation compound is crystallized, the active material expands in the direction of C axis when lithium ion is intercalated and shrinks in the direction of C axis when the lithium ion is de-intercalated. Repeated charging and discharging of a secondary battery causes the stress due to expansion and contraction of the intercalation compound to accumulate, shortening the life of the battery. Increasing intercalation of lithium into and de-intercalation of lithium ion from the positive active material causes changes in crystal structure. Such structural stress also shortens the life of the battery. In order to implement a practical battery, an amount of intercalation and de-intercalation of lithium ion to and from the positive active material must be restricted, being an obstacle to a high capacity battery.

In contrast, an active material for the positive electrode containing the aforementioned amorphous phase has irregular arrangement of atoms, so that intercalation of lithium ion does not significantly change the structure of the active material for positive electrode. In other words, during the charging and discharging of a battery, the active material does not significantly experience expansion and contraction due to the intercalation and de-intercalation of lithium ion. This provides a long-life battery.

A battery using a crystalline active material differs from a secondary battery having Electrode (a) and/or Electrode (b) formed of an amorphous-phase active material according to the present invention, in charging/discharging characteristic of the battery. This will be explained by way of an active material for positive electrode.

Nickel hydroxide and lithium hydroxide are weighed such that nickel and lithium are of the same molar ratio, and then mixed uniformly. The mixture is then placed in an electric furnace and is calcined at 750° C. in flowing oxygen for 20 hours, thereby preparing crystalline nickel acid lithium as a positive active material. Then, acetylene black 20 wt % is added to the thus prepared positive active material and then polyvinylidene fluoride is further added, thereby making a positive electrode. As for a counterelectrode, mesophase micro balls (artificial graphite) heat-treated at 2800° C. was used as a negative active material. These positive and negative active materials are used to manufacture a lithium secondary battery. The negative active material is a crystalline material having graphite skelton structure and therefore the voltage during the charging and discharging has a plateau region where the battery voltage is constant with respect to time elapsed. When the battery is charged and discharged, the discharge characteristic is L-shaped so that discharge curve has a plateau region at slightly less than 4 V. The positive active material of the above experiment has two or more crystal phases and showed that the crystal lattice was continuously changed during discharge with the phases changing between charging and discharging.

Figure 2:
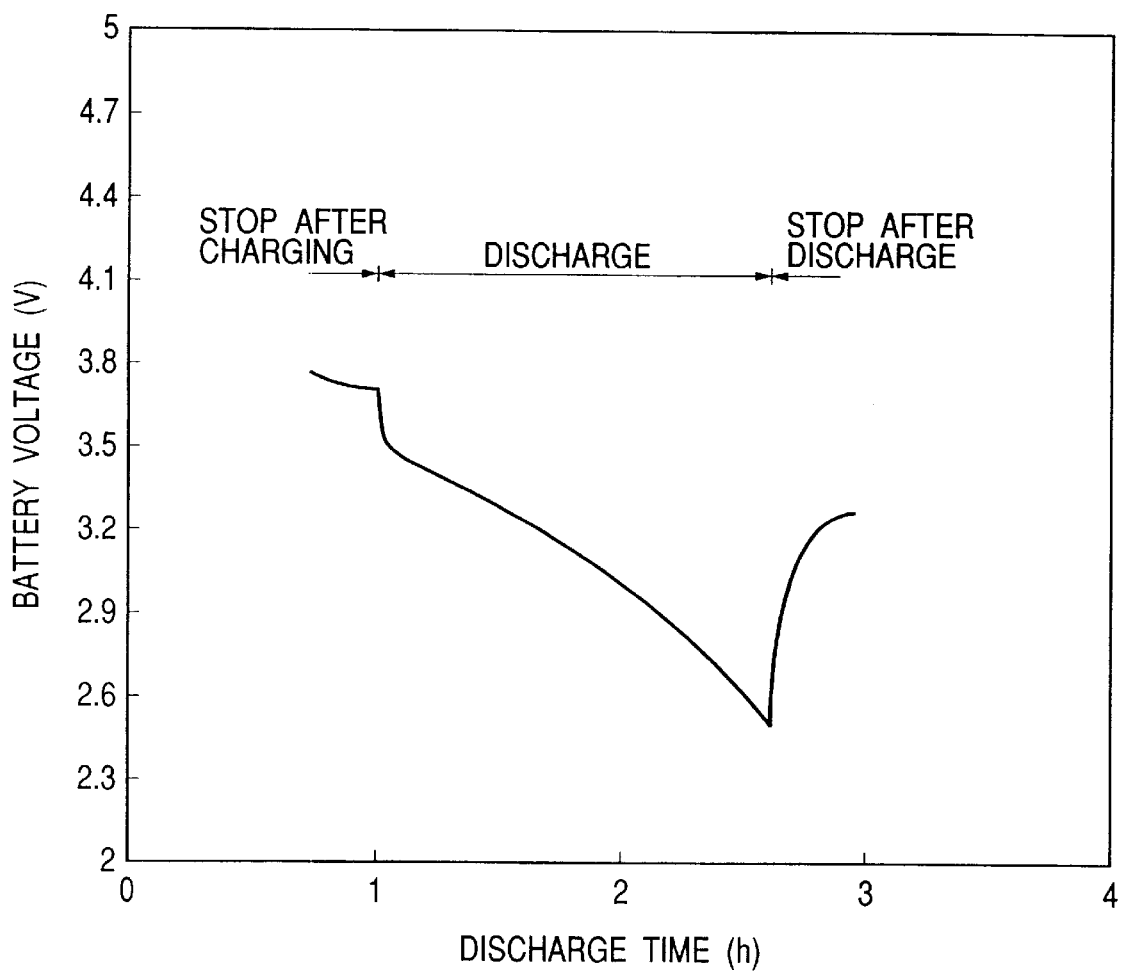
FIG. 2 is a graph showing an example of discharging characteristic of a lithium secondary battery which uses a positive active material of the invention.
Figure 3:
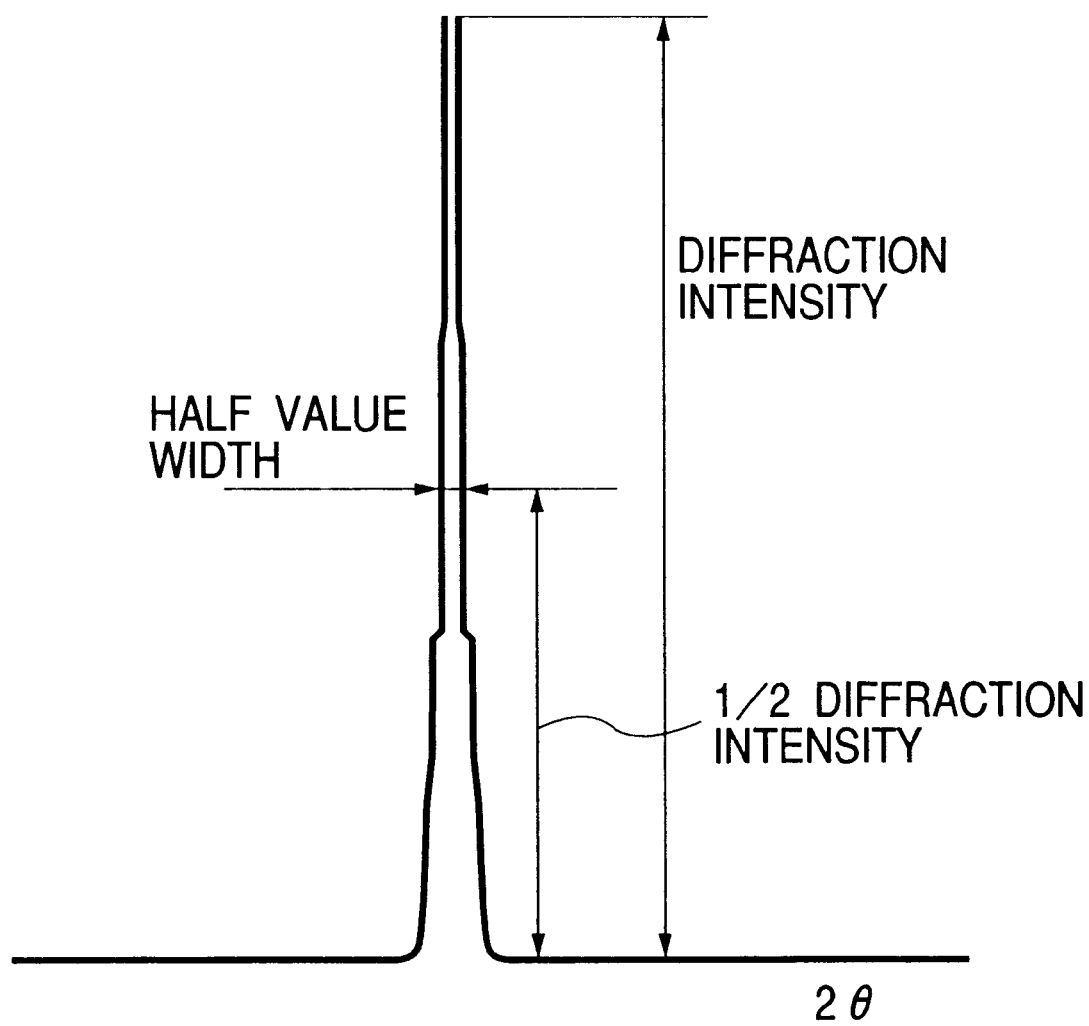
FIG. 3 illustrates half value width.

Next, the aforementioned crystalline nickel acid lithium 80 wt % and acetylene black 20 wt % were put in a planetary ball mill. Using 15-mm diameter stainless balls and 4-cm diameter vessel, mechanical grinding was performed at 4000 rpm and for a 1-hour mixing period. The thus obtained composite material of nickel acid lithium and acetylene black is subjected to X-ray diffraction method for analysis. The analysis revealed that half value width of the respective peak values have increased so that the composite material has been changed into amorphous phase. Then, polyvinylidene fluoride is further added to the composite material of lithium-nickel having an amorphous phase and acetylene black. For a counterelectrode, mesophase micro balls (artificial graphite) were used which is heat-treated at 2800° C. Using these positive and negative polarities, a battery having a composite material of lithium-nickel and acetylene black was manufactured. Then, the battery was subjected to charging and discharging for analysis. When the battery is subjected to charging and discharging, the discharge curve slowly changed describing a curve from at about 4 V to 2.5 V as shown in FIG. 2, a plateau region not being observed. This is because the atomic arrangement of the positive active material is irregular and the structure of the positive active material (host material) changes only slightly even though lithium ion is intercalated. For a first lithium secondary battery of the invention, a positive active material which is used for Electrode (a) and contains an amorphous phase has a half value width of an X-ray diffraction peak of preferably not less than 0.48 degrees at a peak value corresponding to (003) plane or (104) plane (FIG. 3 illustrates half value width).

For a second battery of a lithium secondary battery according to the present invention, a negative active material used for Electrode (b) has a half value width of X-ray diffraction peak of preferably not less than 0.48 degrees at a peak value corresponding to (002) plane or (110) plane. If tin is used as an active material, the half value width is preferably not less than 0.48 degrees at peaks corresponding to (200) plane, (101) plane, and (211) plane.

A material that constitutes an active material that contains an amorphous phase preferably has a half value width of X-ray diffraction peak 10% or larger that of the material before it is formed into the amorphous phase, and more preferably 20% or larger.

Also, the crystallite size of a material for these active material decreases in size with increasing amorphous state. This is desirable. The crystallite size calculated by using Scherrer's equation is preferably not larger than 200 Å for the active materials used in the present invention, and preferably not larger than 400 Å for a negative electrode composite material containing a material that becomes electrochemically inert to substances other than lithium. The crystallite size of an active material is preferably not larger than 50% of that of a crystalline starting material, and more preferably not larger than $2/3$.

(*) Scherrer's equation: $t = 0.9 \lambda / B \cos\theta$ t: crystallite size $\lambda$: wavelength of X-ray beam B: half width value of an X-ray diffraction peak $\theta$: diffraction angle In the present invention, and amorphous phase material used for forming the aforementioned Electrode (a) or Electrode (b) is preferably synthesized by giving physical energy to a crystalline material. More specifically, a centrifugal force is given to a crystalline material (material containing one or more of elements selected from a group consisting cobalt, nickel, manganese, and iron, or material containing one or more elements selected from a group consisting of metal elements and carbon) to generate collision energy. The collision energy is used to form the material into nonuniform crystal, thereby causing irregular atomic arrangement of a crystalline active material by solid phase method. This method eliminates the need for performing a long term treatment at high temperature, as opposed to a method that uses calcining to prompt the reaction of materials. When a centrifugal force is applied to the material, heat generated primarily by collision prompts the reaction of material, allowing the synthesis reaction of the active material to be carried out. The starting material having a lower decomposition temperature is preferred since such a material needs less centrifugal force and synthesis reaction can be carried out in a short time.

For Electrode (a) or Electrode (b), it is desirable to mix a starting material (for an active material) and a second material and give physical energy to the mixed materials, the second material being those where an electrode formed of the active material becomes electrochemically inert during the charging and discharging cycles of the aforementioned lithium battery, or those where an electrode formed of the active material becomes electrochemically inert substances other than lithium during the charging and discharging cycles of the aforementioned lithium battery.

For some materials, the reaction for synthesizing an active material is difficult to be carried out. For example, nickel-family materials for Electrode (a) suffer from some difficulty. In this case, for accelerated reaction, it is desirable to preheat the material salt container to a predetermined temperature, or to place the material salt in an atmosphere in which the material can be oxidized easily (e.g., oxygen atmosphere).

The use of such a method allows synthesis of the active material at room temperature without heating, thereby shortening reaction time. Since synthesis reaction can be carried out at low temperature, the active material containing an amorphous phase can be synthesized efficiently.

Howver, in case of synthesizing at room temperature without heating, an impurity remains therein. Such impurity decomposes during a charging and discharging battery, and reacts with lithium operating as an active material, thereby causing an adverse effect such as degrading an activity of lithium. When the impurity dissolves into a solvent, for example, water or organic solvent, a sufficient rinsing may be performed. As another way, oxidizing, deoxidizing or heating withing inactive gas atmosphere to compose and remove may be used. Wherein, during the heating, it is unnecessary to increase the temperature into a high temperature (e.g., 700° C. or more higher) at which temperature, in general, the active material is systhesized. The temperature at which the impurity can be removed is sufficient.

For example, sodium permanganate, potassium permanganate and lithium compound such as lithium iodide are used as a start material, and are subjected to a physical energy at room temperature, thereby synthesizing material. Therein an impurity sodium iodide or potassium iodide etc. is contained. However, since such impurity easily dissolves into water and alcohol, it can be removed by rinsing.

Further, for example, in case that lithium acetate or manganese acetate is subjected to the physical energy to produce the material, there would possibly be a case that an acetate remains as the impurity. In such case, that material can be decomposed and removed by thermal processing at 200° C. within an oxygen flow.

By means of the above two methods, lithium manganese oxide of high purity and good electric reversibility can be provided. The material produced in that manner is further subjected to the physical energy, thereby it can be made into amorphous, and into material of high electric activity and good electric reversibility.

In the aforementioned method according to the present invention, physical energy, e.g., centrifugal force is given to one or more materials, thereby causing the material particles to collide one another. Reaction takes place due primarily to the collision energy. The material is mechanically crushed, or two or more materials are mechanically mixed into an alloy. For this purpose, a mechanical grinding method or a mechanical alloy method (particularly when metal materials are synthesized into an alloy) can be used. Apparatuses used in the mechanical grinding method or mechanical alloy method may be used in the present invention. However, in addition to the usual mechanical grinding method or mechanical alloy method, the method according to the present invention is further characterized by the following steps:

(1) A centrifugal force is applied to the materials to generate collision energy, thereby causing the material to be mixed and react.

(2) A composite material is formed by mixing with the aforementioned materials that become electrochemically inert, as required.

(3) A material containing an amorphous phase is made from a crystalline material.

A method of forming a material into an amorphous material by using mechanical grinding will be described with reference to FIGS. 4 and 5. Using the method, by way of example, a material 206 of which an electrode is formed is added to a crystalline material 205 to make an ultimate active material, the ultimate active material becoming electrochemically inert during the charging/discharging reaction of the lithium secondary battery.

Figure 4:
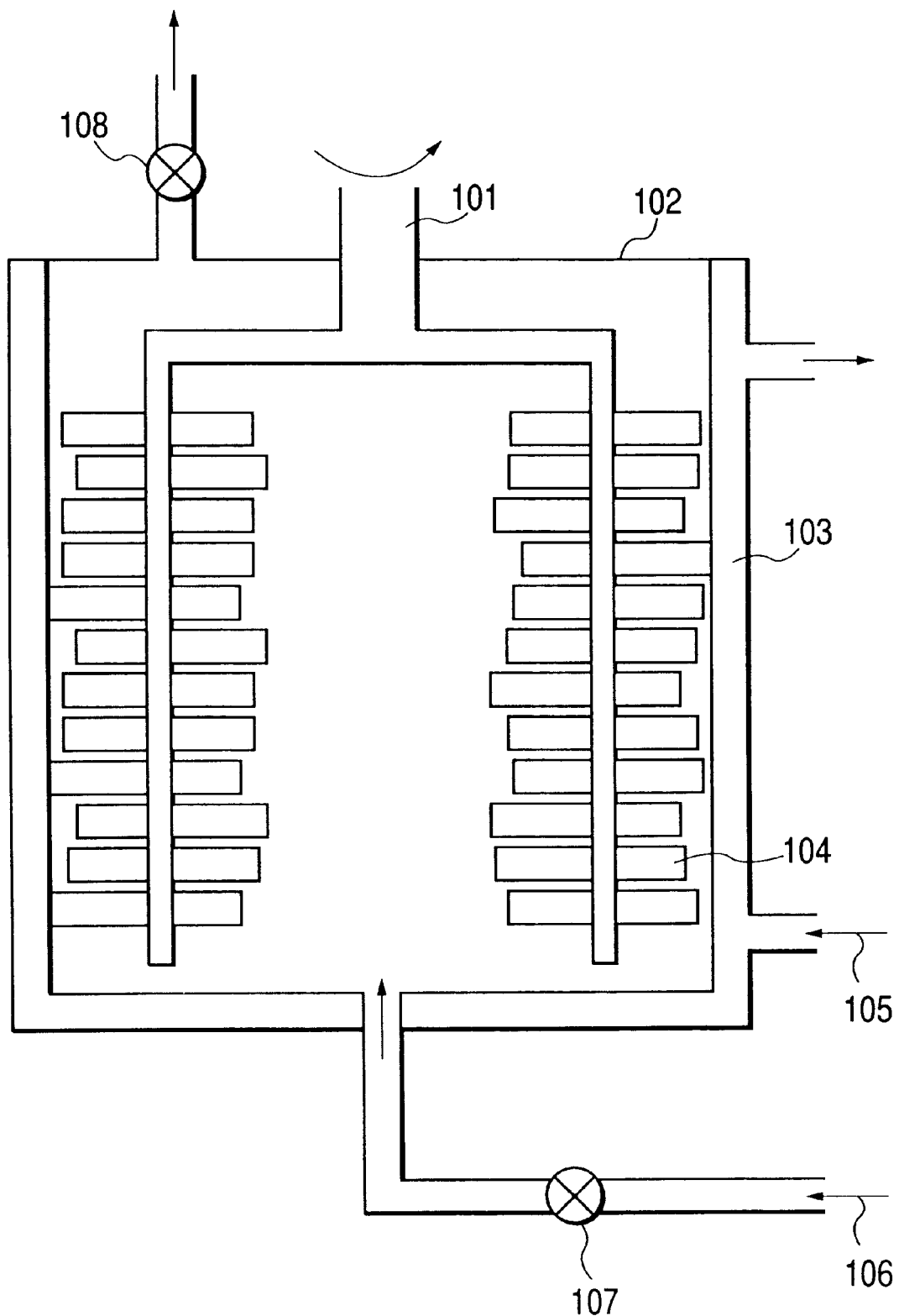
FIG. 4 is a model representation illustrating an apparatus that performs a mechanical grinding.

FIG. 4 is a model representation of the apparatus with which the mechanical grinding is performed. FIG. 5 is a top view of the apparatus of FIG. 4, as seen from above.

The crystalline material 205 and the material 206 that becomes electrochemically inert are placed in a closed container 102, 202 with a cooling jacket 103, 203. A main shaft 101, 201 are rotated (revolved) so that rings 104, 204 are rotated on their own axes. A centrifugal force generated adds an acceleration to the materials placed in the apparatus, so that the material particles collide one another. Repeated collision among the particles causes the crystalline material 205 to have an amorphous phase, and urges the amorphous material 205 and the material 206 to form a composite material. Finally, as shown in FIG. 5, the collision energy forms a composite material 207 with an amorphous phase in which the material 206 uniformly covers the active material 205.

The speeds at which the material 205 is formed into an amorphous material and the composite material 207 is formed of the material 205 and electrochemically inert material 206 vary depending on the rotational speeds of the main shaft, materials of the medium, container, and main shaft. Different atmospheres can be created in the container by selecting the kind of a gas 106 directed into the apparatus. For example, an inert gas such as argon gas can be used if oxidation should be suppressed.

In the aforementioned example, the active material for Electrode (a) may be formed by placing only one kind of crystalline material in the apparatus for mechanical grinding. Two different kinds of crystalline materials may be placed in the apparatus and mixed together.

Conditions of mechanical grinding are determined in accordance with (a) type of the apparatus, (b) the container in the apparatus and material of the medium, (c) centrifugal force, (d) time for which the centrifugal force is applied, (e) the temperature of the atmosphere, and (f) materials to be added.

(a) Type of Apparatus

Figure 5:
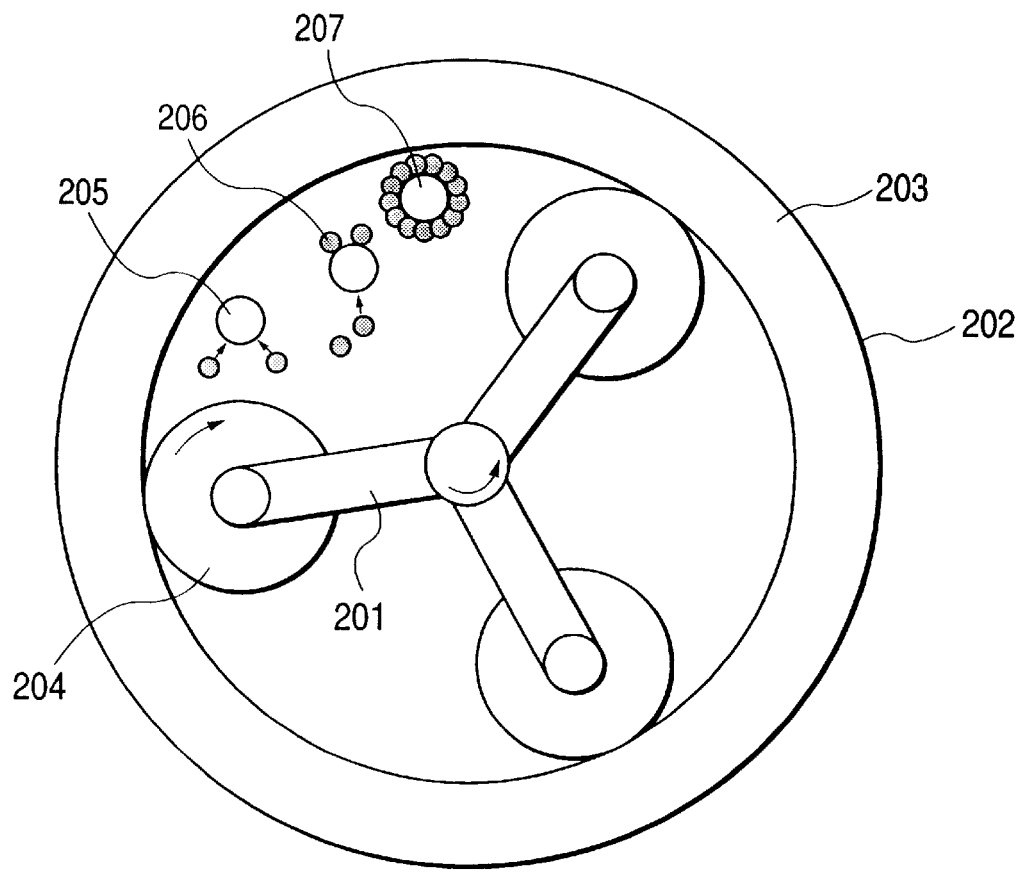
FIG. 5 is a model representation illustrating an apparatus that performs a mechanical grinding.

A preferred apparatus for mechanical grinding is an apparatus as shown in FIGS. 4 and 5 which is capable of giving a large collision energy, e.g., centrifugal force, to the particles of materials. Specifically, the apparatus should be able to revolve or rotate the container in which the materials are placed, or revolve or rotate the medium in the container so that the material in the container is given rotational motion. Such apparatuses include a planetary ball mill, rolling ball mill, oscillating ball mill, various crushers, and high speed mixer, etc.

(b) Materials and Shapes of Medium and Container

The material of the container and medium should be of both wear resistant and corrosion resistant. If the container and medium are ground by a large centrifugal force, the materials for the electrodes are contaminated and may adversely affect the battery characteristic. Also, in grinding the material, acid, alkali, and organic solvent medium are used in some cases. Thus, the container and medium are preferably corrosion resistant. Specific materials for the container and medium include ceramic, agate, stainless, super hard alloy (tungsten carbide). The medium is of the shape of, for example, ball, ring, and bead. The materials for the container and medium are selected taking into account the compatibility with the materials to be subjected to mechanical grinding.

(c) Centrifugal Force

Adding a centrifugal force accelerates the mechanical grinding. However, excessive grinding is detrimental to some material. For example, too large a centrifugal force may create excess heat causing the material to melt. If melting of the material is not desirable, the centrifugal force should be adjusted or the container should be cooled to decrease the atmospheric temperature so that the material does not exceed their melting points.

The conditions of mechanical grinding should be determined taking into account the fact that finely-divided powder of the material is produced.

A ratio G of a centrifugal acceleration to a gravity acceleration should also be considered. Factors that determine G include the weight of the medium, rotational speed of the apparatus, and size of the container.

The centrifugal force is a force that acts on an object of the apparatus (a) in circular motion, acting in radial directions with respect to the circular motion. The centrifugal force may be expressed by the following equation.

Centrifugal force $F = W \cdot \omega^2 \cdot r$ where W is weight of an object (i.e., weight of the medium, though varying depending on the medium used in the apparatus), ω is angular velocity, and r is radius of the container.

The centrifugal acceleration a can be expressed by the following equation.

Centrifugal acceleration $a = \omega^2 \cdot r$

The ratio G of a centrifugal acceleration to a gravity acceleration can be expressed by the following equation.

$G = a/g = \omega^2 \cdot r/g$

The value of G is preferably in the range of 5 to 200G, more preferably in the range of 10 to 100G, even more preferably in the range of 10 to 50 G. The range of the value of G changes depending on the material selected as described above.

(d) Time Duration for Which Centrifugal Force is Applied

A centrifugal force should be applied for a length of time in accordance with the apparatus, the materials of the container, and centrifugal force, etc. The longer the time, the more the process of making an active material into an amorphous phase is encouraged and the process of manufacturing a composite material is prompted, the composite material being formed of the active material and a material that becomes electrochemically inert.

(e) Atmosphere

Higher atmospheric temperatures advantageously prompt mechanical grinding. If the material is a salt, the atmospheric temperature should be elevated in order to synthesize an active material. However, heat generated during mechanical grinding causes the atmospheric temperature to increase with the result that the material converted into amorphous phase may sometimes return to crystalline material. Thus, the atmospheric temperature should be set taking this fact into account. Cooling may be required in some cases if the material has a low melting point.

During mechanical grinding, some additional materials such as metal may be oxidized. An inert gas atmosphere is preferred since oxidation of the material may be suppressed by performing mechanical grinding. Conversely, the apparatus may be set for oxidization atmosphere using, for example, oxygen after the mechanical grinding. Then, a predetermined lithium salt is added to the material and then the material is subjected to mechanical grinding again, thereby changing the added metal into metal oxide containing lithium. This process reduces additional metals after mechanical grinding, except electrically conductive filler, thereby ensuring high capacity of the battery.

The atmosphere includes oxidization atmosphere, reduction atmosphere, and inert atmosphere. The oxidization atmosphere is created by using one or more of oxygen, ozone, air, vapor, and ammonia gas. These gas atmosphere prompts oxidization.

Desirable reduction atmospheres are hydrogen, a mixture of an inert gas and hydrogen. The reduction atmosphere of these gases prompt reduction and suppresses oxidization.

Desirable inert gas atmosphere may be created be selecting one or more of argon gas, helium gas, and nitrogen gas. The reduction atmosphere of these gases suppresses oxidization and prompts nitrifying.

In some cases, processing the material in oxygen plasma or nitrogen plasma may prompt oxidization and nitrifying more effectively if the processing is carried out after the mechanical grinding.

(f) Materials to be Added

For Electrode (a), a crystalline material (starting material from which an active material is made, and an electrode is formed of the active material) is added to and mixed with a second material which becomes electrochemically inert during the charging and discharging cycles of the lithium battery.

For Electrode (b), a crystalline material (starting material from which an active material is made, and an Electrode (a) and (b) is formed of the active material) is added to and mixed with a second material which becomes electrochemically inert to substances other than lithium during the charging and discharging cycles of the lithium battery.

Then, a centrifugal force is applied while mechanical grinding, thereby urging the mixed material to be formed into an amorphous active material having an amorphous phase. Thus, adding these materials provides chemical stability to a battery.

As described in the above item (c), an amount of energy (E) applied to the powder materials during the mechanical grinding varies with the weight of the medium and the rotational speed of the container as described in (c). As is clear from an equation $E=mv^2$, it is desirable that a heavier powder material is used and a higher rotational speed is used. The weight of the powder material is determined by the specific weight and the diameter of the powder particles. However, the diameter of the particles of the medium should be smaller than that of crystalline material if the particles are to cover the surfaces of the active material (i.e., crystalline material to be formed into amorphous material) or if the particles are to have a large area in contact with the crystalline material. Specifically, the diameter of the particles is preferably not more than 1/3, more preferably not more than 1/5 of that of the crystalline material of a first composition.

When the electrochemically inert material reacts with the crystalline material deep in the crystalline material, or two or more kinds of materials are mixed for mechanical grinding and the material salts are subjected to premixed fusion, particles having larger diameters receive more energy so that the active material is encouraged to become an amorphous material, and the material (starting material) for the active material and the electrochemically inert material are formed into a composite material more easily.

If added materials are metals or carbon materials, these materials are dispersed uniformly over the surface of or into the crystalline material, so that current collection capability is improved more than when metals or carbon materials are merely mixed together with the crystalline material. Thus, this is more preferable. Crystalline materials to be formed into an active material is mechanically ground together with metals or carbon materials, thereby obtaining positive active material or negative active material whose surfaces are covered with the metal or carbon. Thus, in some cases, the electrically conductive filler need not be added or may be reduced. A small amount of metal or carbon covering the active material is enough to ensure electrical conductivity, reducing an amount of electrically conductive filler in the electrodes, increasing filling density of the active material. Resulting electrodes are of high energy density.

Making an active material containing an amorphous portion by the mechanical grinding method increases the sites where lithium ion can be intercalated and de-intercalated, compared with the crystalline material before it is subjected to the mechanical grinding. When performing the mechanical grinding, lithium compound is added so that lithium ion can enter the sites to increase the capacity of the electrodes. The added lithium compounds include hydroxide, nitrides, sulfide, carbonate, alcoxide, etc. In particular, lithium nitride exhibits ionic conduction and therefore lithium nitride is preferable even if it cannot enter the sites. If a lithium compound is to be added, it is desirable that the centrifugal force is applied or the atmospheric temperature is increased during the mechanical grinding so as to cause lithium salt to melt, thereby facilitating lithium to easily enter between the layers of active material.

A large amount of an inert material added to the active material is preferable since it facilitates the mechanical grinding, the inert material being those where an electrode formed of the active material becomes electrochemically inert during the charging and discharging cycles of the lithium battery, or those where an electrode formed of the active material becomes electrochemically inert substances other than lithium during the charging and discharging cycles of the lithium battery. However, an excess amount of the inert material causes the filling density of the active material in the electrode to decrease. This causes energy density to decrease. Thus, the amount of the inert material should be determined taking into account the advantages and disadvantages of adding a large amount of inert material. Specifically, a preferred amount is in the range of 1 to 50% of the active material, and more preferably in the range of 1 to 20%. A still more preferable amount is in the range of 1 to 10% where the increase in the utilization efficiency of the active material compensates for the decrease of energy density. The inert material should also be in the range of 1 to 10% if it is to be added as an alternative of electrically conductive filler.

With the lithium secondary battery according to the present invention, the negative electrode of Group (1) is of a configuration other than Electrode (a) and Electrode (b), and the positive electrode of Group (2) or (4) is of a configuration other than Electrode (a).

The negative electrode of Group (1) can be formed of an active material which is crystalline and retains lithium before discharging, e.g., lithium metal, transition metal oxide or carbon material into which lithium is intercalated, oxides and sulfides of transition metals, and crystalline containing a lithium alloy. Amorphous carbon containing carbon blacks such as ketjen black and acetylene black, natural graphite, and artificial carbon such as hardly-graphitized carbon and easily-graphitized carbon may also be used. In addition, amorphous vanadium pentoxide may also be used.

The positive electrode of Group (2) or (4) can usually be formed of an active material, for example, crystalline transition metal oxides, transition metal sulfides, lithium-transition metal oxides, or lithium-transition sulfides. These transition metal elements include those partially having d-shell or f-shell, e.g., Sc, Y, lanthanoids, actinoid, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Especially, first transition metal family is preferable, which includes Ti, V, Cr, Mn, Fe, Co, Ni, and Cu. Additionally, amorphous vanadium pentoxide may also be used.

The starting materials of an active material for the aforementioned positive and negative electrode are selected taking into account the potentials of the starting materials of an active material for a counterelectrode.

Manufacturing of Electrode (a) and Electrode (b) using the aforementioned active materials, other electrodes, and a secondary battery manufactured using the Electrodes (a) and (b) will not be described.

(Electrode Configuration and Method of Manufacturing the Electrode)

Electrode (a), Electrode (b), and other electrodes of a secondary battery according to the invention are formed of collector, active material, electrically conductive filler, binder, etc. One way of manufacturing these electrodes is as follows: An active material containing an amorphous portion or other active material, electrically conductive filler, and binder are mixed together with a solvent into a paste-like material. Then, the paste-like material is applied on the surface of the collector. If an additional material to be dispersed uniformly on the surface of the active material or into the active material is a highly electrically conductive material such metal and carbon, then electrically conductive filler may be reduced or need not be added. The paste-like material is applied by, for example, the coater application method or screen print method.

The electrically conductive filler for the electrodes include graphite, carbon black such as ketjen black and acetylene black, fine metal powder of, for example, nickel and aluminum. Binder used for the electrodes include polyolefin such as polyethylene and polypropylene, or fluorine plastics such as polyvinylidene fluoride and tetrafluoroethylene polymer, polyvinylalcohol, cellulose, and polyamide.

The material of active material and binder are preferably dehydrated sufficiently before they are made into a battery.

The collector of the electrodes plays a role of efficiently supplying or collecting a current consumed in the electrode reaction during charging/discharging. Thus, the material for collector is preferably highly electrically conductive, and inert to battery reaction. In other words, when a voltage is applied for charging and discharging (i.e., oxidization and reduction), the active material of electrodes or added materials to the active material do not react to the battery reaction or to the electrolyte.

The collector for the positive electrodes includes nickel, titanium, aluminum, stainless steel, platinum, palladium, gold, zinc, alloys, and a composite metal of two or more of these metals.

The collector for the negative electrodes includes copper, nickel, titanium, stainless steel, platinum, palladium, gold, zinc, alloys, and a composite metal of two or more of these metals. The shape of the collector may be a plate, foil, mesh, sponge, fiber, punched metal, expand metal.

(Form and Structure of Battery)

As for a concrete form of the secondary battery according to the present invention, it may have, for example, a flat form, a cylindrical form, a rectangular parallelepiped form, a sheet form or the like. Speaking of a structure of the battery, it may be, for example, of a single layer type, a multiple layer type, a spiral type or the like. Out of batteries of different forms and types, a spiral type cylindrical battery has a characteristic that it permits enlarging areas of electrodes by rolling a separator which is sandwiched between a negative electrode and a positive electrode, thereby being capable of supplying a high current at a charging or discharging stage. Furthermore, a battery that has the rectangular parallelepiped form or the sheet form has a characteristic that it permits effectively utilizing accommodation spaces in appliances that are to be composed by accommodating a plurality of batteries therein.

Figure 6:
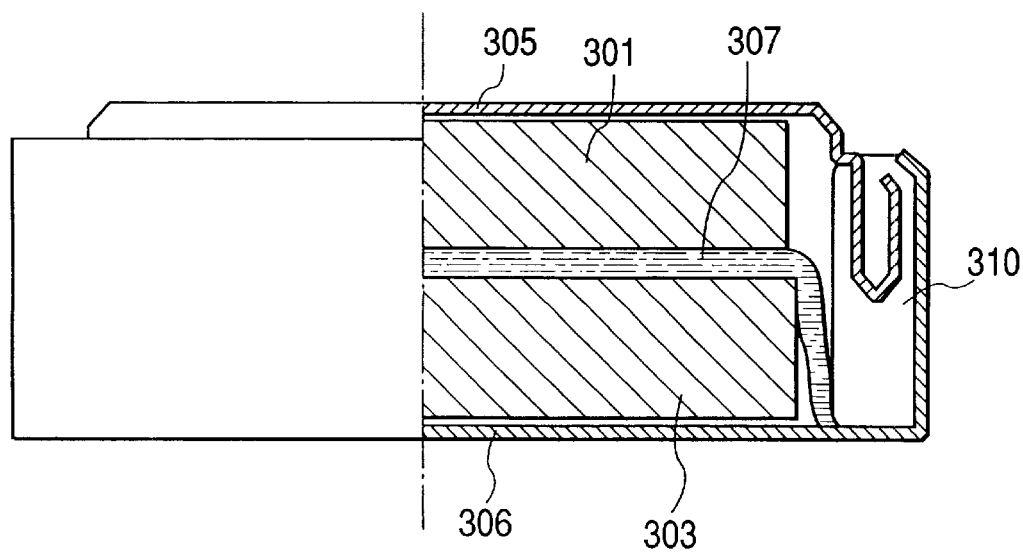
FIG. 6 is a cross-sectional view of a single layer flat type battery.
Figure 7:
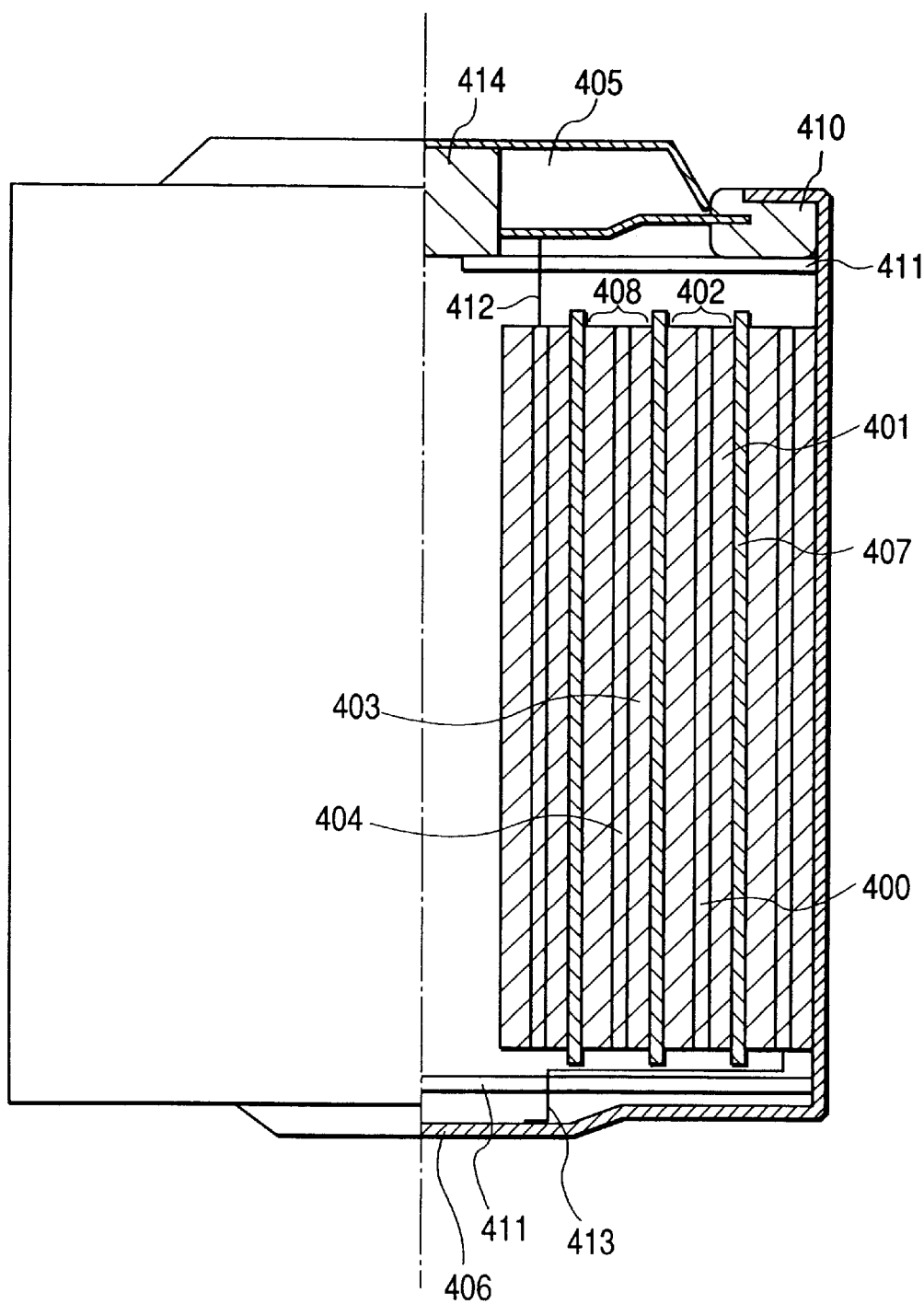
FIG. 7 is a cross-sectional view of a spiral cylindrical battery.

Now, description will be made in more detail of forms and structures of the battery with reference to FIGS. 6 and 7. FIG. 6 is a sectional view of a single layer type flat battery (a coin type) and FIG. 7 is a sectional view of a spiral type cylindrical battery. These lithium batteries have negative electrodes, positive electrodes, electrolytes, separators, battery housings, output terminals and so on.

In FIGS. 6 and 7, reference numerals 301 and 401 represent negative electrodes, reference numerals 303 and 408 designate positive electrodes, reference numerals 305 and 405 denote negative electrode terminals (negative electrode caps), reference numerals 306 and 406 represent positive electrode terminals (positive electrode cans), reference numeral 307 and 407 designate separator electrolytes, reference numerals 310 and 410 denote gaskets, a reference numeral 400 represents a negative electrode collector, a reference numeral 404 designates a positive electrode collector, a reference numeral 411 denotes an insulating sheet, a reference numeral 412 represents a negative electrode lead, a reference numeral 413 designates a positive electrode lead and a reference numeral 414 denotes a safety valve.

In the flat secondary battery (coin type) shown in FIG. 6, the positive electrode 303 that contains a positive electrode material layer (an active material layer) and the negative electrode 301 that contains a negative electrode material layer (an active material layer) are laminated by way of the separator 307 that maintains at least an electrolyte, and the laminated assembly is accommodated from a side of the positive electrode into the positive electrode can 306 used as a positive and the negative electrode is covered with the negative electrode cap 305 used as a negative electrode. A gasket 310 is disposed in the rest portion of the positive electrode can.

In the spiral type cylindrical secondary battery shown in FIG. 7, the positive electrode 408 that has a positive electrode (active material) layer 403 formed on the positive electrode collector 404 is opposed to a negative electrode 402 that has the negative electrode (active material) layer 401 formed on the negative electrode collector 400 by way of the separator 407 that holds at least an electrolyte so as to compose a multiplexly rolled cylindrical laminated assembly. The cylindrical laminated assembly is accommodated in the positive electrode can 406 used as a positive electrode terminal. Furthermore, the negative electrode cap 405 is disposed as a negative electrode terminal on a side of an opening of the positive electrode can 406 and a gasket 410 is disposed in another section of a negative electrode can. The cylindrical laminated electrode assembly is separated from a side of a positive electrode cap by the insulating sheet 411. The positive electrode 408 is connected to the positive electrode can 406 by way of the positive electrode lead 413. The negative electrode 402 is connected to the negative electrode cap 405 by way of the negative electrode lead 412. The safety valve 414 is disposed on the side of the negative electrode cap to adjust an internal pressure of the battery.

Electrodes (a) and/or (b) made of an active material that have the X-ray diffraction characteristic described above and an amorphous phase or electrode other than the electrodes (a) and (b) are used in the active material layer of the negative electrode 301, the active material layer of the positive electrode 303, the active material layer 401 of the negative electrode 402 and the active material layer 403 of the positive electrode 408 to obtain a battery in any one of the conditions mentioned in 1) to 5) above.

Now, description will be made of an example of assembling procedures for the battery shown in FIGS. 6 and 7.

(1) The separator (307 or 407) is sandwiched between the negative electrode (301 or 402) and the formed positive electrode (306 or 408), and assembled into the positive electrode can (306 or 406).

(2) After pouring the electrolyte, the negative electrode cap (305 or 405) assembled with the gasket (310 or 410).

(3) The assembly obtained in (2) above is caulked to complete the battery.

It is desirable that preparations of the materials for the lithium battery and assembly of the battery described above are carried out in dry air from which moisture has been eliminated sufficiently or a dry inert gas.

Description will be made of members other than the electrodes used to compose the secondary battery explained above.

(Separator)

The separator has a role to prevent shorting between the negative electrode and the positive electrode. Furthermore, the separator may have another role to maintain the electrolyte. The separator must have pores through which lithium ions travel, and be insoluble with the electrolyte and stable. Therefore, glass, polyolefin such as polypropylene or polyethylene, nonwoven fabric such as fluororesin and materials having microporous structures, for example, are used preferably as the separator. Furthermore, metal oxide films having micropores or resin films of a composite metal oxide are also usable as the separator. A metal oxide film that has a multiple layer structure through which dendrite can hardly pass in particular exhibits an effect to prevent shorting. Safety can be enhanced by using fluororesin which is a flare retardant, glass or metal oxide film which is a non-combustible material.

(Electrolyte)

In the secondary battery according to the present invention, an electrolyte can be used in three ways mentioned below:

(1) The electrolyte is used as it is.
(2) The electrolyte is used in a condition of a solution in which it is dissolved with a solvent.
(3) The electrolyte is used in a condition solidified by adding a gelling agent such as polymer.

The electrolyte is generally dissolved with a solvent and used in a condition maintained in a porous separator.

The electrolyte must have an electric conductivity preferably not lower than $1 \times 10^{-3}$ S/cm or more preferably not lower than $5 \times 10^{-3}$ S/cm at 25° C.

As an electrolyte for a lithium battery that uses lithium as an active material for negative electrode, there can be mentioned, for example, an acid such as $H_2SO_4$, HCl or $HNO_3$, a salt composed of lithium ion ($Li^+$) and Lewis acid ions ($BF_4^-$, $PF_6^-$, $AsF_6^-$, $ClO_4^-$, $CF_3SO_3^-$ or $BPh_4^-$ (Ph: phenyl group)) or a mixture salt thereof. Furthermore, a salt composed of anions such as sodium ions, potassium ions or tetralkyl ammonium ions and Lewis acid ions is also usable. It is desirable to sufficiently dehydrate and deoxidize this salt, for example, by heating it under vacuum.

Usable as a solvent for the electrolyte is, for example, acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1,2-dimethoxyethane, chlorobenzene, γ-butyrolactone, dioxolane, sulfolane, nitromethane, dimethylsulfoxide, dimethyl sulfoxide, dimethoxyethane, methyl formate, 3-methyl-2-oxazolidinone, 2-methyltetrahydrofulan, 3-propylsydnone, sulfur dioxide, phosphoryl chloride, thionyl chloride, sulfuryl chloride or a mixture liquid thereof.

It is preferable to dehydrate the solvent mentioned above, for example, with activated alumina, molecular sieve, phosphorus pentaoxide or calcium chloride. It is preferable to distill certain solvents in inert gases in the presence of alkaline metals for elimination of impurities and dehydration.

In case of an electrolytic solution, it is preferable to gel it to prevent its leakage. As a gelling agent, it is desirable to use a polymer which swells by absorbing a solvent from the electrolytic solution. Usable as such a polymer is polyethylene oxide, polyvinyl alcohol, polyacrylamide or the like.

(Insulating Packing)

Usable as materials for the gaskets (310, 410) are, for example, fluororesin, polyamide resin, polysulfone resin and various kinds of rubbers. An opening of the battery can be closed not only by the "caulking" with an insulating packing as shown in FIGS. 6 and 7 but also by sealing with glass or adhesive agent, welding and soldering. Furthermore, various kinds of organic resin materials and ceramic materials are usable as the insulating sheet shown in FIG. 7.

(Outside Can)

An outside can for the battery consists of a positive electrode can (306 or 406) and a negative electrode cap (305 or 405). Stainless steel is preferably used as a material for the outside can. Titanium-clad stainless steel sheets, copper-clad stainless steel sheets, nickel-plated steel sheets are used frequently in particular.

It is preferable to use the stainless steels mentioned above for the batteries shown in FIGS. 6 and 7 wherein the positive electrode can (306) and the positive electrode can (408) function also as battery housings. In a case where a positive electrode or a negative electrode can does not serve as a battery housing, however, it is possible to use, in addition to the stainless steels, metals such as zinc, plastics such as polypropylene and composite materials of metals or glass fibers and plastics.

(Safety Valve)

A lithium secondary battery is equipped with a safety valve as safety means against enhancement of an internal pressure of the battery. Though no safety valve is shown in FIG. 7, a rubber, spring, metal ball, rupture foil or the like, for example, is usable as a safety valve.

EXAMPLES

Now, the present invention will be described more detailedly with reference to examples illustrated in the accompanying drawings.

First, description will be made of a method to prepare the active material which contains an amorphous phase in the lithium secondary battery according to the present invention with reference to FIGS. 8 to 11 and on the basis of evaluations with X-ray diffraction profiles of samples of prepared active materials. In FIGS. 8 to 11, vertical heights of peaks of the X-ray diffraction profiles are traced to indicate relative levels with no intensity (cps) specified.

Example 1

Nickel hydroxide and lithium hydroxide were weighed and uniformly mixed at a molar ratio of 1:1 between nickel and lithium, and calcined at 750° C. for 20 hours in an electric furnace filled with oxygen atmosphere, thereby obtaining lithium-nickel oxide. An X-ray diffractometry (Cu—Kα) provided a result indicating that the lithium-nickel oxide was in a crystallized condition belonging to the hexagonal system ((a) of FIG. 8). Furthermore, a laser type particle size distribution measurement indicated that the lithium-nickel oxide had a mean particle diameter of 13 μm. Then, the lithium-nickel oxide was mixed simply with nickel having a mean particle diameter of 1 μm and analyzed by the similar X-ray diffractometry ((b) in FIG. 8). This analysis provides a result which allowed to observe peaks belonging to lithium-nickel oxide and nickel.

On the other hand, 50 wt % of lithium nickel oxide in the crystallized condition and 50 wt % of nickel were put into a vessel of a planetary ball mill (having a diameter of 4 cm) and subjected to mechanical grinding for one or two hours using stainless steel balls having a diameter of 15 mm with a driving motor set at a rotating frequency of 3700 rpm to apply 15G to the material. X-ray diffractometry of a material thus obtained provides a result shown in (c) and (d) of FIG. 8. Paying attention to a peak of the (003) surface (2θ=19°), for example, the result indicated that the peak was lower and broader than that before the treatment with the planetary ball mill. Speaking more concretely, a ratio of 1850 cps/degree between an X-ray diffraction intensity and a half value width before the mechanical grinding was lowered to 300 cps/degree by the mechanical grinding for one hour ((c) of FIG. 8, intensity not shown), and reduced to a level too low for calculation, or the peak disappeared, after the material was further treated for another hour by the mechanical grinding ((d) of FIG. 8). That is, it was recognized that crystallinity can be changed to the non-crystallinity, or that the peak can be broadened and finally disappeared by prolonging a mixing time, strengthening a centrifugal force and changing other conditions of a planetary ball mill. The peak of the added nickel metal remained even 2 hours later though it was lowered by the mechanical grinding as the mixing time was prolonged (peaks indicated by dots • in (d) of FIG. 8).

The analysis described above indicated that the active material obtained by the method according to the present invention is essentially or quite different from a simple mixture of lithium-nickel oxide and a nickel metal.

Figure 8:
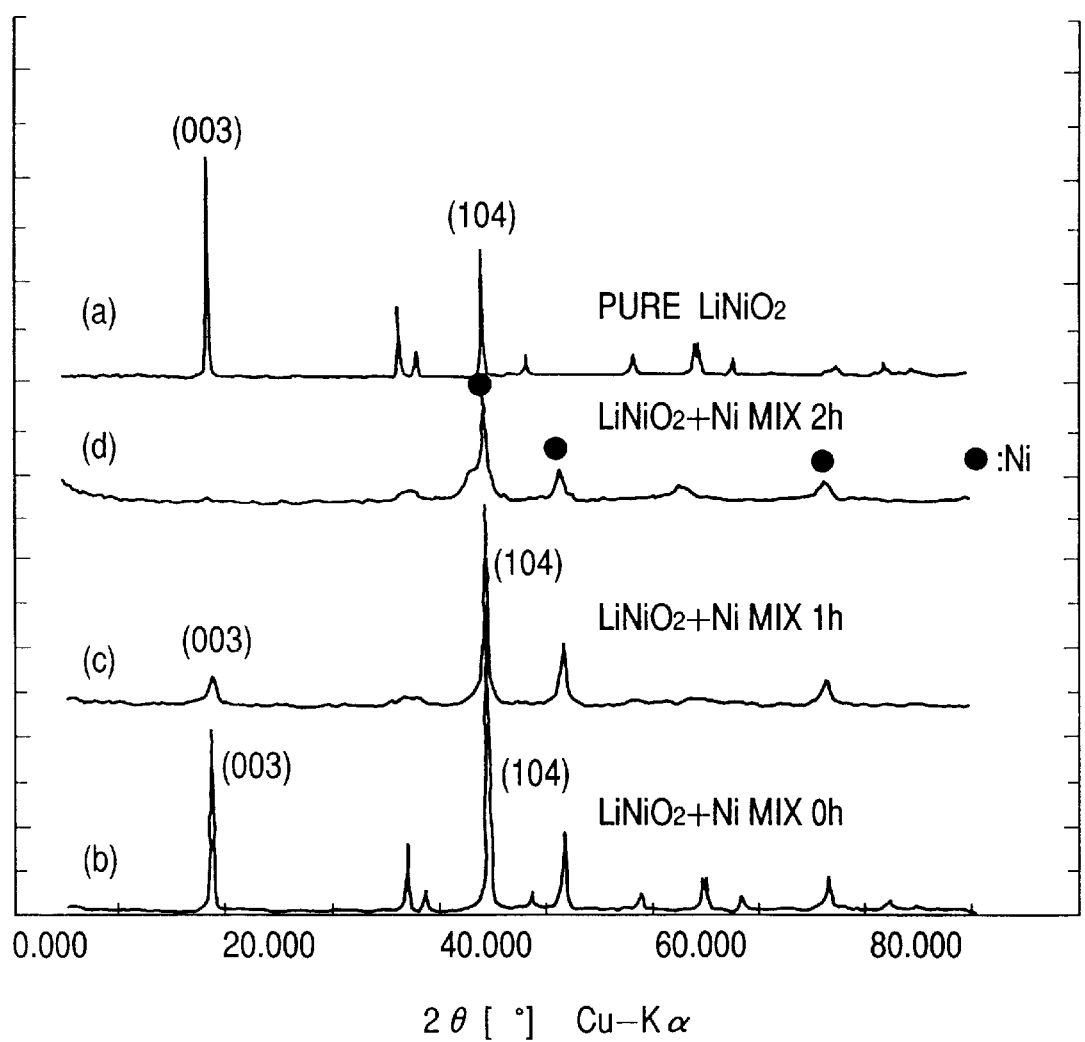
FIG. 8 is a chart illustrating an X-ray diffraction profile of an active material when the conditions of mechanical grinding are changed.
Figure 9:
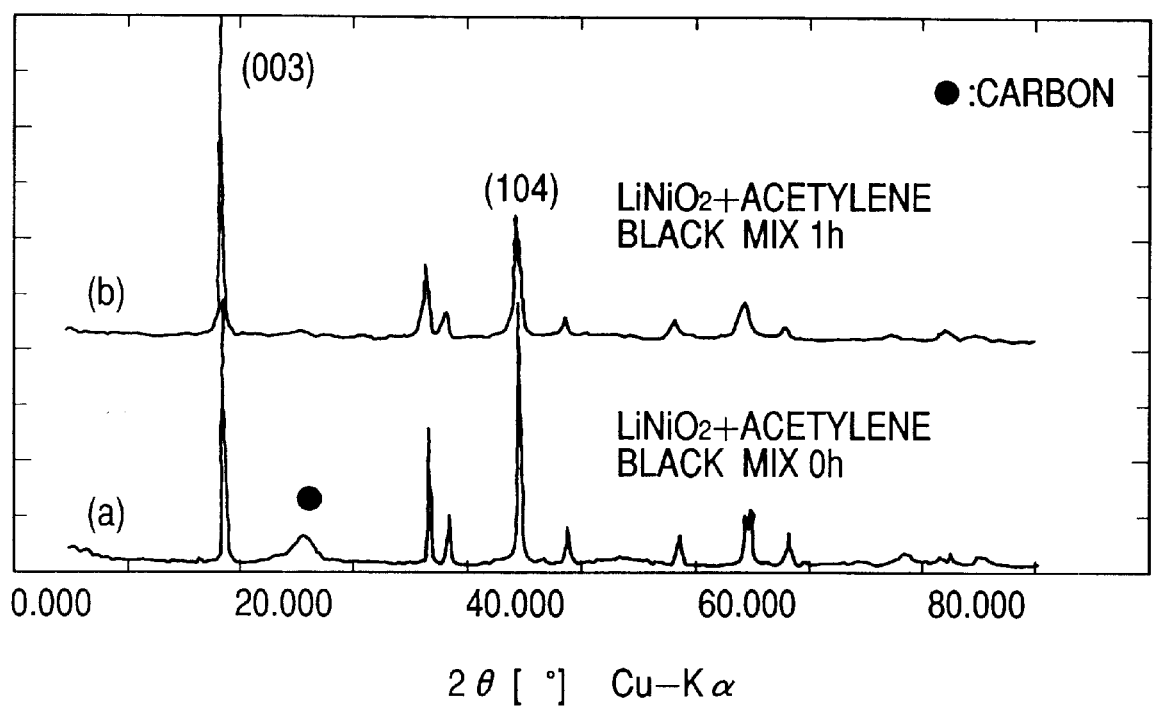
FIG. 9 is a chart illustrating an X-ray diffraction profile of an active material when the conditions of mechanical grinding are changed.

A further measurement of a non-crystallinity degree of the active material obtained in the example described above (lithium-nickel oxide mixed with nickel for two hours and having the profile shown in (d) of FIG. 8) by the X-ray small angle scattering method allowed to observe ununiform density fluctuation from scattering angles and scattering intensities, thereby confirming that the material was made amorphous. Furthermore, a reflected high-speed electron emission diffractometry (RHEED) provided results which permitted observation of a weak ring pattern of the material prepared by mixing lithium-nickel oxide with nickel for one hour and a halo pattern as a diffraction pattern of the material prepared by mixing for two hours, thereby confirming that the material was made amorphous.

Largely different from the rapid-cooling method or the solution reaction method which is generally used for making amorphous a crystalline material and provides a material having an atomic structure which is irregular also at short periods (microscopically), the method according to the present invention characterized by using crystalline substances as starting materials and imparting a physical energy such as a centrifugal force provides a material having an atomic structure which is not completely irregular but has portions which remain microscopically regular at short periods.

The material obtained by the method according to the present invention has an electron conductivity owing to the atomic structure having the portions which remain regular at the short periods even after it is made amorphous.

Accordingly, the method according to the present invention is capable of providing a substance which has a charging/discharging capacity and a service life which are larger and longer than those of an amorphous active material prepared by the rapid-cooling method or the like.

Furthermore, an XMA analysis of the lithium-nickel oxide subjected to the mechanical grinding allowed to observe surfaces of lithium-nickel oxide particles which were covered with nickel.

Example 2

Using amorphous carbon (acetylene black) in place of nickel used in Example 1, 80 wt % of lithium nickel oxide and 20 wt % of acetylene black were mixed in a planetary ball mill. A vessel having a diameter of 4 cm was used and a driving motor was set at a rotating frequency of 4500 rpm for mixing. Using stainless balls having a diameter of 15 mm, the mixture was subjected to mechanical grinding for one hour. Before and after the mechanical grinding, the material was subjected to X-ray diffractometry as in Example 1 and results shown in (a) and (b) of FIG. 9 were obtained. Paying attention to peaks of the (003) peak and the (104) peak, for example, a ratio between peak heights ((003) surface/(104) surface) of 1.5 before the mixing with the planetary ball mill (mechanical grinding) ((a) of FIG. 9) was enhanced to 2.8 ((b) of FIG. 9), thereby indicating remarkable growth of the peak of the (003) surface and development of a layer structure. Furthermore, a half value width of the (104) surface was enlarged and tailings of other peaks were also prolonged. That is, it was recognized that the mechanical grinding with the planetary ball mill advanced non-crystallinity of the material. Furthermore, a peak of carbon produced by the added acetylene black (indicated by a dot • in (a) of FIG. 9, Example 3) disappeared after the mechanical grinding.

Example 3

Lithium carbonate and cobalt oxide was weighed at a molar ratio of 1:1, mixed in dry conditions and calcined at 850° C. in a high-temperature electric furnace filled with atmosphere. Lithium-cobalt oxide thus obtained was crushed by a mill until it had a mean particle diameter of 15 $\mu$m (as measured with laser type particle size distribution meter). 50 wt % of titanium having a mean particle diameter of 3 $\mu$m was added to lithium-cobalt oxide. After setting a planetary ball mill (vessel diameter 23 cm) at a revolving frequency of 200 rpm, the material was subjected to mechanical grinding while changing a mixing time from 0 to one hour. X-ray diffractometry was conducted before and after the mechanical grinding as in Example 1. Analytical results are shown in (b) and (c) of FIG. 10. An X-ray profile of lithium-cobalt oxide alone is also shown for reference ((a) of FIG. 10).

Figure 10:
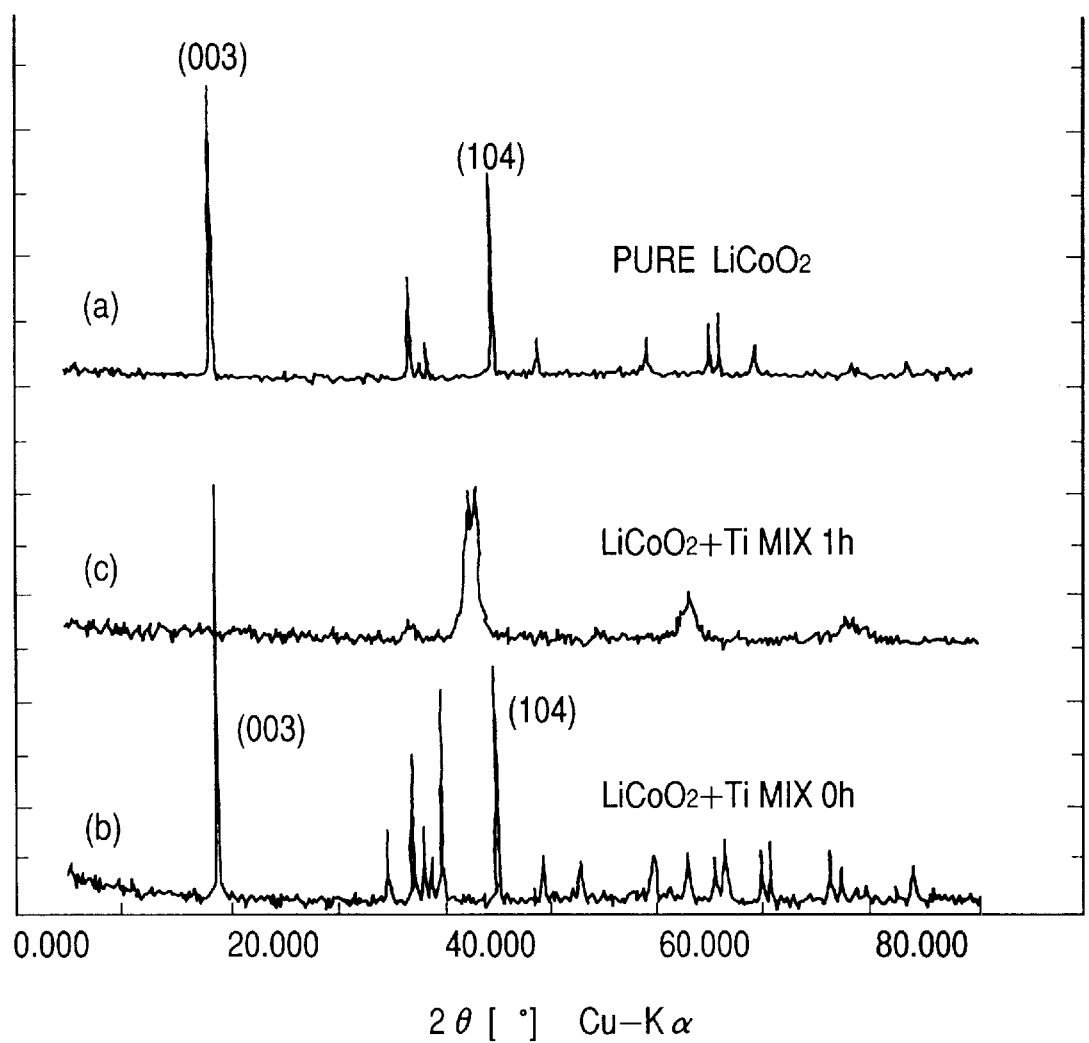
FIG. 10 is a chart illustrating an X-ray diffraction profile of an active material when the conditions of mechanical grinding are changed.

A peak of lithium-cobalt oxide disappeared only one hour after the mixing as shown in FIG. 10. That is, it was recognized that crystalline lithium-cobalt oxide ((a) and (b) of FIG. 10) was made amorphous by the mechanical grinding ((c) of FIG. 10). However, it was also recognized that titanium was changed into titanium oxide due to the mixing conducted in atmosphere. Therefore, it was improper to use the material as an active material with no treatment though the mechanical grinding advanced non-crystallinty of the material. When non-oxidizing atmosphere is used, oxidation of titanium can be prevented and the material is usable as an active material.

Example 4

Lithium nitrate and manganese dioxide were weighed at a molar ratio of 1:1, mixed in dry conditions and calcined at 800° C. in a high-temperature electric furnace filled with oxygen atmosphere. Lithium-manganese oxide thus obtained was crushed by a mill until it has a mean particle diameter of 13 $\mu$m (as measured with a laser type particle size distribution meter). 50 wt % of aluminium having a mean particle diameter of 1 $\mu$m was added to lithium-manganese oxide. After setting a planetary ball mill (vessel diameter of 23 cm) at a revolving frequency of 150 rpm, the material was subjected to mechanical grinding while changing a mixing time (mechanical grinding time) from 0 to two hours. Before and after the mechanical grinding, the material was evaluated by X-ray diffractometry as in Example 1. Evaluation results are shown in (b), (c) and (d) of FIG. 11. An X-ray profile of lithium-manganese oxide alone is also shown for reference ((a) of FIG. 11).

Figure 11:
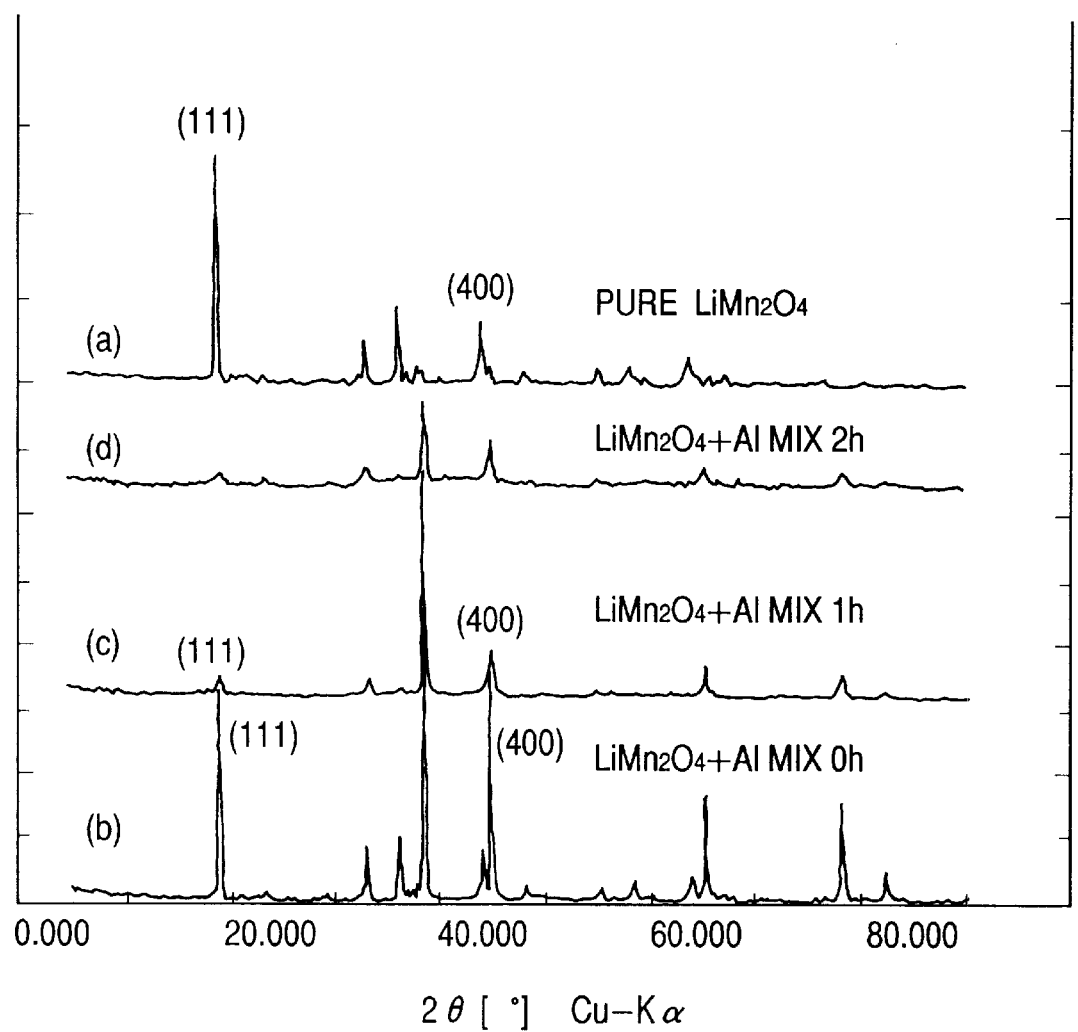
FIG. 11 is a chart illustrating an X-ray diffraction profile of an active material when the conditions of mechanical grinding are changed.

From FIG. 11, it will be understood that a height of a peak which is located in the vicinity of 19° or belongs to the (111) surface was remarkably lowered after mixing for one hour ((c) of FIG. 11) and that the peak is collapsed or the material was made more amorphous after the mixing was continued for another hour ((d) of FIG. 11).

Though Examples 1 to 4 described above were effected mainly to prepare active materials for positive electrodes, it can be recognized from the results therein that the method according to the present invention provides similar effects also to prepare active materials for negative electrodes and makes it possible to obtain active materials for negative electrodes which contain amorphous phases.

Example 5

Natural graphite having a mean particle diameter of 5 μm (crystalline material having crystal size of 1700 Å) and 20 wt % of copper powder having a mean particle diameter of 1 μm were put in a vessel of a planetary ball mill (having a diameter of 23 cm). With a revolving frequency set at 300 rpm, the material was subjected to mechanical grinding while changing a mixing time from 0 to 2 hours. X-ray diffractometry which was conducted before and after the mechanical grinding as in Example 1 allowed to observe an X-ray diffraction peak corresponding to the (002) surface which was lowered with lapse of the mixing time. That is, the analysis allowed to recognize a property of the material was changed from crystallinity to non-crystallinity like that of the active material described above. X-ray small angle scattering analysis and reflected high-speed electron emission diffractometry also indicated that the material was made amorphous.

Now, description will be made of examples of the lithium secondary battery according to the present invention.

Example 6

In Example 6, a lithium secondary battery having the sectional structure shown on FIG. 6 was manufactured.

Procedures to manufacture and assemble component members of the battery will be described with reference to FIG. 6.

(1) Manufacturing Procedures for Positive Electrode 303

Nickel hydroxide, cobalt hydroxide and lithium hydroxide were mixed at a molar ratio of 0.4:0.1:0.5, and heated at 800° C. for 20 hours in an electric furnace filled with oxygen atmosphere, thereby preparing lithium-cobalt-nickel oxide. Analysis of this material with an X-ray diffractometer indicated a half width of 0.17 and a crystallite size of 680 Å. Furthermore, a measurement with a laser type particle size distribution meter indicated a mean particle diameter of 12 μm.

Then, 90 wt % of lithium-cobalt-nickel oxide, 5 wt % of aluminium having a mean particle diameter of 2 μm and 5 wt % of acetylene black were put into a vessel having a structure shown in FIGS. 4 and 5 (vessel diameter of 10 cm), and the vessel was filled with an inert gas atmosphere of argon. At room temperature and a revolving frequency of 520 rpm which is to apply 15 G, the material was subjected to mechanical grinding. for a mixing time (mechanical grinding time) of two hours using stainless steel as the media (104 and 204). X-ray diffractometry (Cu—Ka) of the material was conducted before and after the mechanical grinding as in Example 1. The X-ray diffractometry before the mechanical grinding indicated an X-ray profile of the material which had sharp peaks belonging to the hexagonal system, whereas the X-ray diffractometry after the mechanical grinding exhibited lowering of a peak of the (003) surface in the vicinity of 19°, for example, and broadening of other peaks, thereby indicating that a property of the material changed from crystallinity to non-crystallinity. A half value width was 0.65 and a crystallite size was 150 Å. Furthermore, a measurement by the X-ray small angle scattering method allowed to observe ununiform density fluctuation from scattering angles and scattering intensities.

Using lithium-cobalt-nickel oxide prepared above as an active material for positive electrode, 5 wt % of polyvinylidene fluoride powder was added to the substance, which was added and mixed to and with N-methylpyrrolidone, thereby obtaining a paste. This paste was applied to an aluminium foil, dried and further dried under vacuum at 150° C., thereby manufacturing the positive electrode 303.

(2) Manufacturing Procedures for Negative Electrode 301

95 wt % of natural graphite having a mean particle diameter of 5 μm was added and mixed to and with N-methylpyrrolidone in which 5 wt % of polyvinylidene fluoride was dissolved, thereby obtaining a paste to be used as an active material. This paste was applied to a copper foil and dried, thereby manufacturing the carbon negative electrode 301.

(3) Preparing Procedures for Electrolyte 307

A solvent was prepared so as to contain a mixture of sufficiently dehydrated ethylene carbonate (EC) and dimethyl carbonate (DMC) in equal amounts. Then, 1 M (mol/l) of lithium borate tetrafluoride salt was dissolved into this mixture solvent, thereby preparing the electrolyte 307.

(4) Separator 307

A microporous separator of polyethylene was used.

(5) Assembly of Battery

The separator 307 maintaining the electrolyte was sandwiched between the positive electrode 303 and the negative electrode 301, and inserted into a positive electrode can 306 made of titanium-clad stainless steel.

Then, the positive electrode can was covered with an insulating packing 310 made of polypropylene and a negative electrode cap 305 made of titanium-clad stainless steel, and caulked, thereby manufacturing a lithium secondary battery.

Example 7

70 wt % of lithium-cobalt-nickel oxide used at the stage to prepare the active material in Example 6 and 30 wt % of nickel having a mean particle size of 1 μm were put into the vessel shown in FIGS. 4 and 5 (having a diameter of 10 cm), which was filled with inert atmosphere of argon gas. At room temperature and a revolving frequency of 520 rpm which was to apply 15G, the material was subjected to mechanical grinding using an apparatus having the structure shown in FIGS. 4 and 5, and stainless steel as the media (104 and 204). The material was mixed in procedures similar to those in Example 6, except for a mixing time (mechanical grinding time) which was differently changed (from 0 to 120 minutes). Materials obtained at different mixing times were analyzed by the X-ray diffractometry (Cu—Kα) as in Example 1. Evaluation results are summarized in Table 1 shown below, wherein values at different mixing times are normalized to that at a mixing time of 0 minute which was taken as 100.

TABLE 1

| Mixing time (mechanical grinding time) | X-ray diffraction intensity/half value width relative to that at mixing time of 0 minute |
| --- | --- |
| 0 minute | 100 |
| 30 minutes | 35 |
| 60 minutes | 15 |
| 90 minutes | 3 |
| 120 minutes | – (*: Diffraction intensity immeasurable) |

As apparent from Table 1, X-ray diffraction intensities were lowered and half values widths were increased as a mixing time (mechanical grinding time) was longer. Finally, a diffraction intensity was immeasurable at a mechanical grinding time of 120 minutes, indicating that crystallinity of the material was changed to non-crystallinity. Since the active materials for positive electrodes which were treated at different mechanical grinding times have non-crystallinity at different degrees, it is assumed that batteries using these substances will have different charging/discharging capacities and charging/discharging curves.

Example 8

In Example 8, a negative electrode was manufactured in procedures described below in place of those for the negative electrode used in Example 6.

95 wt % of natural graphite having a mean particle diameter of 5 μm which was used in Example 6 and 5 wt % of copper powder having a mean particle diameter of 1 μm were put into a vessel of a planetary ball mill (having a diameter of 23 cm), which was filled with inert atmosphere of argon gas. At a revolving frequency of 400 rpm which was to apply 75G, the material was subjected to mechanical grinding for a mixing time (mechanical grinding time) of two hours using stainless steel balls having a diameter of 12 mm. X-ray diffractometry was conducted before and after the mechanical grinding of the material as in the Example 1. The X-ray diffractometry after the mechanical grinding showed no peak of carbon in the material which was observed before the mechanical grinding, thereby indicating that a property of the material was changed from crystallinity to non-crystallinity. The disappearance of the X-ray diffractometric peak made it impossible to determine a half value width or a crystallite size.

A lithium secondary battery was manufactured with the same members as those in Example 6, except for the material subjected to the mechanical grinding which was used as an active material for a negative electrode.

Example 9

In Example 9, a secondary battery was manufactured with the same members as those in Example 6, except for a positive electrode which was prepared in procedures described below:

Manganese dioxide and lithium nitrate were mixed at a molar ratio of 1:1, and put into a vessel of a planetary ball mill (having a diameter of 23 cm). Atmosphere in the vessel was not substituted for an inert gas. At a revolving frequency of 480 rpm which was to apply 111G, the material was subjected to mechanical grinding using zirconia balls having a diameter of 10 mm. After the mechanical grinding, the powder material was at approximately 300° C., indicating that it was heated by an energy produced by a centrifugal force.

X-ray diffractometry of the material which was subjected to the mechanical grinding indicated slightly broadened peaks but provided an X-ray profile which was attributed to lithium-manganese oxide as in Example 1. That is, lithium-manganese oxide could be synthesized at room temperature with no calcining process. Furthermore, a calculation of a crystallite size by Scherrer's formula provided 180 Å, indicating that the material was made amorphous at a degree higher than lithium-manganese oxide of crystallite size of 550 Å which was prepared by the calcination method. The material exhibited a half value width of 0.6.

Using lithium-manganese oxide as an active material for positive electrode and adding 75 wt % of acetylene black to the active material, a positive electrode was prepared in procedures similar to those in Example 6. A lithium secondary battery was manufactured using the positive electrode as in Example 6.

Example 10

In Example 10, a positive electrode was prepared in procedures described below in place of those for the positive electrode used in Example 6.

95 wt % of lithium-cobalt-nickel oxide having a mean particle diameter of 12 μm and 5 wt % of acetylene black prepared in Example 6 were put into a vessel of a planetary ball mill (having a diameter of 23 cm), which was filled with inert atmosphere of argon gas. At a revolving frequency of 200 rpm which was to apply 20G, the material was subjected to mechanical grinding for a mixing time (mechanical grinding time) of three hours using alumina balls having a diameter of 15 mm. X-ray diffractometry was conducted before and after the mechanical grinding as in Example 1. The X-ray diffractometry before the mechanical grinding exhibited an X-ray profile which had sharp peaks belonging to the hexagonal system, whereas the X-ray diffractometry after the mechanical grinding indicated enlargement of a half value width, for example, of a peak of the (003) surface in the vicinity of 19°, enlargement of a half value width (003) of a peak of the (104) surface in the vicinity of 44° in particular which was more remarkable that of the peak of the (003) surface and a higher peak ratio of (003)/(104). The X-ray diffractometry after the mechanical grinding exhibited other peaks which were broadened, thereby indicating that a property of the material was changed from crystallinity to crystallinity containing non-crystallinity. A half value width of the (104) surface was 0.55 after the mechanical grinding.

Using the lithium-cobalt-nickel oxide as an active material for positive electrode, a positive electrode was prepared in procedures similar to those in Example 6. A lithium secondary battery was manufactured with the same members as those in Example 6, except for the positive electrode which was prepared in the procedures described above.

Example 11

In Example 11, a positive electrode was prepared in procedures described below in place of those in Example 6.

Manganese dioxide and lithium nitrate were mixed at a molar ratio of 1:1, and calcined at 800° C. for 10 hours in an electric furnace filled with atmosphere, thereby obtaining lithium-manganese oxide. A measurement with a laser type particle size distribution meter indicated a mean particle diameter of 15 μm.

90 wt % of the lithium-manganese oxide and 10 wt % of aluminium powder having a mean particle diameter of 2 μm were put into a vessel of a planetary ball mill (having a diameter of 4 cm), which was filled with inert atmosphere of argon gas. After setting a driving motor at a rotating frequency of 2600 rpm to apply 10G to the material, mechanical grinding was conducted for a mixing time (mechanical grinding time) of two hours using stainless steel balls having a diameter of 15 mm.

X-ray diffractometry was conducted before and after the mechanical grinding as in Example 1. The X-ray diffractometry before the mechanical grinding exhibited an X-ray profile having sharp peaks belonging to the hexagonal system, whereas the X-ray diffractometry after the mechanical grinding indicated enlargement of a half value width of a peak of the (111) surface in the vicinity of 19°, for example, enlargement of a half value width of a peak of the (400) surface in the vicinity of 44° in particular which was more remarkable than that of the peak of the (111) surface, and a higher peak ratio of (400)/(111). A half value width was 0.5 after the mechanical grinding. The X-ray diffractometry after the mechanical grinding provided other peaks which were broadened, thereby indicating that crystallinity was changed into non-crystallinity. A calculation by Scherrer's formula provided a crystallite size of 190 Å which was smaller than 460 Å, indicating that the material has non-crystallinity at a degree higher than that before the mechanical grinding.

Using the lithium-cobalt-nickel oxide as an active material for positive electrode, a positive electrode was prepared in procedures similar to those in Example 6. A lithium secondary battery was manufactured with the same members as those in Example 6, except for the positive electrode which was prepared in the procedures described above.

Example 12

In Example 12, a negative electrode was manufactured in procedures described below in place of those in Example 6.

The natural graphite having a mean particle diameter of 5 μm used in Example 6 and 3 wt % of titanium powder having a mean particle diameter 3 μm were put into an apparatus having the structure shown in FIGS. 4 and 5, and a vessel of the apparatus was filled with inert atmosphere of argon gas. At room temperature and a revolving frequency of 730 rpm which was to apply 30G to the material, mechanical grinding was conducted for a mixing time (mechanical grinding time) of three hours using the apparatus shown in FIGS. 4 and 5 in combination with stainless steel selected as the media (104 and 204). The material was analyzed by X-ray diffractometry before and after the mechanical grinding as in Example 1. The X-ray diffractometry after the mechanical grinding indicated disappearance of a peak of carbon which was observed before the mechanical grinding, thereby indicating that crystallinity was changed into non-crystallinity. A half value width or a crystallite size could not be determined since the X-ray diffractometric peak disappeared.

Using this carbon material as an active material for negative electrode, a negative electrode was prepared in procedures similar to those in Example 6. Successively, a lithium secondary battery was manufactured with same members as those in Example 6, except for the negative electrode which is described above.

Example 13

In Example 13, a negative electrode was prepared in procedures described below in place of those in Example 6.

97 wt % of crystalline tin powder having a mean particle diameter of 10 μm and 3 wt % of ketjen black were put into a vessel of a planetary ball mill (having a diameter of 23 cm), which was filled with inert atmosphere of argon gas. At a revolving frequency of 200 rpm to apply 20G to the material, mechanical grinding was conducted for a mixing time (mechanical grinding time) of two hours using stainless steel balls having a diameter of 15 mm. X-ray diffractometry which was conducted before and after the mechanical grinding as in Example 1. The x-ray diffractometry after the mechanical grinding indicated lowering of a peak corresponding to the (200) surface, a half value width of 0.49 and a crystallite size of 250 Å.

Subsequently, a negative electrode was prepared with the same materials as those in Example 6, except for the material which was subjected to the mechanical grinding. Successively, a lithium secondary battery was manufactured with the same members as those in Example 6, except for the negative electrode which was prepared in the procedures described above.

Example 14

In Example 14, a negative electrode was prepared in procedures described below in place of those in Example 6.

90 wt % of crystalline silicon powder having a mean particle diameter of 5 μm, 5 wt % of acetylene black and 5 wt % of copper powder having a mean particle diameter of 1 μm were put into a vessel of a planetary ball mill (having a diameter of 23 cm), which was filled with inert atmosphere of argon gas. At a revolving frequency of 300 rpm to apply 45G to the material, mechanical grinding was conducted for a mixing time (mechanical grinding time) of two hours using stainless steel balls having a diameter of 10 mm. X-ray diffractometry conducted was conducted before and after the mechanical grinding as in Example 1. The x-ray diffractometry after the mechanical grinding indicated disappearance of a peak of silicon and non-crystallinity of the material. The disappearance of the X-ray diffractometric peak made it impossible to determine a half value width and a crystallite size.

Subsequently, a negative electrode was prepared with the same materials as those in Example 6, except for the material which was subjected to the mechanical grinding. Successively, a lithium secondary battery was manufactured with the same members as those in Example 1, except for the negative electrode which was prepared in the procedures described above.

Example 15

In Example 15, a positive electrode was prepared in procedures described below in place of those in Example 6.

Only the lithium-cobalt-nickel oxide having a mean particle diameter of 12 μm which was prepared in Example 6 was put into a vessel of a planetary ball mill (having a diameter of 23 cm), which was filled with inert atmosphere of argon gas. After setting a revolving frequency at 300 rpm to apply 45G to the material, mechanical grinding was conducted for a mixing time (mechanical grinding time) of four hours using stainless steel balls having a diameter of 10 mm. X-ray diffractometry was conducted before and after the mechanical grinding as in Example 1. The X-ray diffractometry before the mechanical grinding exhibited an X-ray profile having sharp peaks belonging to the hexagonal system, whereas the X-ray diffractometry after the mechanical grinding indicated enlargement of a half value width of a peak of the (003) surface in the vicinity of 19° for example, enlargement of a half value width of a peak of the (104) surface in the vicinity of 44° in particular which was more remarkable than that of the (003) surface and a higher peak ratio of (003)/(104). The (104) surface had a half value width of 0.57 and a crystallite size was 180 Å. Other peaks were also broadened to indicate that crystallinity was changed to non-crystallinity.

A positive electrode was prepared in the same procedures as those in Example 6, except for the lithium-cobalt-nickel oxide thus obtained which was used as an active materia for positive electrode and 5 wt % of acetylene black which was added to the active material. Successively, a lithium secondary battery was manufactured with the same members as those in Example 6, except for the positive electrode which was prepared as described above.

Example 16

In Example 16, a negative electrode was prepared in procedures described below in place of those in Example 6.

Only the natural graphite having a mean particle diameter of 5 µm which was used in Example 6 was put into a vessel of a planetary ball mill (having a diameter of 23 cm), which was filled with inert atmosphere of argon gas. After setting a revolving frequency at 480 rpm to apply 111G to the material, mechanical grinding was conducted for a mixing time (mechanical grinding time) of three hours using zirconia balls having a diameter of 10 mm. X-ray diffractometry was conducted before and after the mechanical grinding as in Example 1. The X-ray diffractometry exhibited a peak of carbon, whereas the X-ray diffractometry after the mechanical grinding showed no peak of carbon, thereby indicating that a property of the material changed from crystallinity to non-crystallinity.

Using the carbon thus obtained as an active material for negative electrode, a negative electrode was prepared in procedures similar to those in Example 6. A positive electrode was prepared in the same procedures as those in Example 6, except for the lithium-cobalt-nickel oxide prepared in Example 6, acetylene black and polyvinylidene fluoride which were used as active materials for positive electrode. Successively, a lithium secondary battery was manufactured with the same members as those in Example 6, except for the negative electrode and the positive electrode which were prepared as described above.

Example 17

90 wt % of the lithium-cobalt-nickel oxide having a mean particle diameter of 12 µm prepared in Example 6, 5 wt % of aluminium having a mean particle diameter of 1 µm and 5 wt % of acetylene black were put into a vessel of a planetary ball mill (having a diameter of 23 cm), which was filled with inert atmosphere of argon gas. Then, mechanical grinding was conducted in different conditions of the planetary ball mill: rotating frequencies from 0 to 600 rpm, mixing times (mechanical grinding times) from 0 to five hours, materials of balls (stainless steel, zirconia and alumina) and diameters (5 to 15 µm). X-ray diffractometry of the material was conducted before and after the mechanical grinding to evaluate a crystallinity, a half value width (of the (003) surface) and a crystallite size as in Example 1.

A lithium secondary battery was manufactured with the same members as those in Example 6, except for a positive electrode which was prepared with the material which was subjected to the mechanical grinding.

Comparative Example 1

5 wt % of polyvinylidene fluoride powder was added to a mixture consisting of 90 wt % of the crystalline lithium-cobalt-nickel oxide having a mean particle diameter of 12 µm prepared in Example 6, 5 wt % of aluminium having a mean particle diameter of 2 µm and 5 wt % of acetylene black (an amount of the mixture taken as 95 wt %), and the mixture was added and mixed to and with N-methylpyrrolidone, thereby preparing a paste. This paste was applied to an aluminium foil, dried and further dried at 150° C. under vacuum, thereby preparing a positive electrode. A lithium secondary battery was manufactured with the same members as those in Example 6, except for the positive electrode which was prepared as described above.

Comparative Example 2

5 wt % of polyvinylidene fluoride powder was added to a mixture consisting of 95 wt % of the crystalline lithium-cobalt-nickel oxide having a mean particle diameter of 12 µm prepared in Example 6 and 5 wt % of acetylene black (an amount of the mixture taken as 95 wt %), and the mixture wad added and mixed to and with N-methylpyrrolidone, thereby preparing a paste. This paste was applied to an aluminium foil, dried and further dried at 150° C. under vacuum, thereby preparing a positive electrode. A lithium secondary battery was manufactured with the same members as those in Example 6, except for the positive electrode which was prepared as described above.

Comparative Example 3

A material was prepared by mixing the manganese dioxide and lithium nitrate which were used for preparing the positive electrode in Example 4 at a molar ratio of 1:1, calcining the mixture in atmosphere and crushing it. 5 wt % of acetylene black was added to 95 wt % of the material obtained above (an amount of the mixture taken as 95 wt %) and 5 wt % of polyvinylidene fluoride, and the mixture was added and mixed to and with N-methylpyrrolidone, thereby preparing a paste. This paste was applied to an aluminium foil, dried and further dried at 150° C. under vacuum, thereby preparing a positive electrode. A lithium secondary battery was manufactured with the same members as those in Example 6, except for the positive electrode which was prepared in the procedures described above.

Comparative Example 4

90 wt % of crystalline lithium-manganese oxide having a mean particle diameter of 15 µm was mixed with 10 wt % of aluminium having a mean particle diameter of 2 µm, 5 wt % of polyvinylidene fluoride was added to the mixture (an amount of the mixture taken as 95 wt %), and the mixture was added and mixed to and with N-methylpyrrolidone, thereby preparing a paste. This paste was applied to an aluminium foil, dried and further dried at 150° C. under vacuum, thereby preparing a positive electrode. A lithium secondary battery was manufactured with the same members as those in Example 6, except for the positive electrode which was prepared in the procedures described above.

Comparative Example 5

95 wt % of the natural crystalline graphite having a mean particle diameter of 5 µm used for preparing the negative electrode in Example 6 was mixed with a 5 wt % of copper having a mean particle diameter of 1 µm (an amount of this mixture was taken as 95 wt %), 5 wt % of polyvinylidene fluoride was added to the mixture, and the mixture was added and mixed to and with N-methylpyrrolidone, thereby preparing a paste. This paste was applied to an aluminium foil, dried and further dried at 150° C. under vacuum, thereby preparing a negative electrode. A lithium secondary battery was manufactured with the same members as those in Example 6, except for the negative electrode which was prepared in the procedures described above.

Comparative Example 6

97 wt % of the natural crystalline graphite having a mean particle diameter of 5 µm used for preparing the negative electrode in Example 6 was mixed with 3 wt % of titanium having a mean particle diameter of 3 µm (an amount of this mixture was taken as 95 wt %), 5 wt % of polyvinilidene fluoride was added to the mixture, and the mixture was added and mixed to and with N-methylpyrrolidone, thereby preparing a paste, A negative electrode was prepared in procedures similar to those in Example 6. A lithium secondary battery was manufactured in procedures similar to those in Example 6.

Comparative Example 7

97 wt % of the crystalline tin powder having a mean particle diameter of 10 μm used for preparing the negative electrode in Example 13 was mixed with 3 wt % of ketjen black (an amount of the mixture was taken as 95 wt %), 5 wt % of polyvinylidene fluoride was added to the mixture, and the mixture was added and mixed to and with N-methylpyrrolidone, thereby preparing a paste. A negative electrode was prepared using this paste in procedures similar to those in Example 6. A lithium secondary battery was manufactured with the same members as those in Example 6, except for the negative electrode which was prepared in the procedures described above.

Comparative Example 8

A paste was prepared together with N-methylpyrrolidone by mixing 90 wt % of the crystalline silicon powder having a mean particle diameter of 5 μm used in Example 14 with 5 wt % of acetylene black and 5 wt % of copper powder having a mean particle diameter of 1 μm, and adding 5 wt % of polyvinylidene fluoride. Using this paste, a negative electrode was prepared in procedures similar to those in Example 6. A lithium secondary battery was manufactured with the same members as those in Example 6, except for the negative electrode which was prepared in the procedures described above.

Comparative Example 9

A paste was obtained by adding 5 wt % of polyvinylidene fluoride powder to 95 wt % of the natural graphite having a mean particle diameter of 5 μm used in Example 6, and adding and mixing the mixture to and with N-methylpyrrolidone. This paste was applied to a copper foil, dried and further dried at 150° C. under vacuum, thereby preparing a negative electrode. A lithium secondary battery was manufactured with the same members as those in Example 6, except for the negative electrode which was prepared in the procedures described above.

Performance of the lithium secondary batteries which were manufactured as described above (Examples 6, 8 to 16, and 17) was evaluated. For evaluating performance of the batteries, charging/discharging cycle tests were effected to determine charging capacities, cyclic service lives and irreversible capacities at first cycles of the batteries.

For the cyclic tests, it was determined that a single cycle consisted of a charge/discharge time at 1C (a current level of capacity/time multiplied by 1) taking an electric capacity calculated from an active material for positive electrode as standard and a rest time of 30 minutes. HJ-106M manufactured by Hokuto Denko Corp. was used for charge/discharge tests of the batteries. The charge/discharge test was started from a charging step, a battery capacity was determined as a discharging capacity as a third cycle and a cyclic service life was determined as a number of cycles repeated before a battery capacity became smaller than 60% of an initial capacity. A cutoff voltage for charge was set at 4.5 V and that for discharge at 2.5 V. An irreversible capacity at a first cycle was determined as a capacity which was within 100% of a charging capacity but ineffective for discharging.

Table 2 summarizes results obtained by performance evaluations of the lithium secondary batteries manufactured in Examples 6, 8, 10, 11 and 15. Cyclic service lives and discharging capacities were normalized to values in corresponding Comparative examples which were taken as 1.0.

TABLE 2

| | Discharging capacity | Cyclic service life | Irreversible capacity at first cycle |
|---|---|---|---|
| Example 6/ Comparative example 1 | 1.21 | 2.3 | 0.8 |
| Example 8/ Comparative example 1 | 1.32 | 2.5 | 0.7 |
| Example 10/ Comparative example 2 | 1.19 | 2.1 | 0.55 |
| Example 11/ Comparative example 4 | 1.11 | 1.7 | 0.6 |
| Example 15/ Comparative example 2 | 1.16 | 1.5 | 0.9 |

From Table 2 shown above, it will be understood that the secondary batteries using the materials which were made amorphous by the mechanical grinding as the active materials for positive electrode had discharging capacities 11 to 32% higher and cyclic service lives 50 to 150% longer than those of the batteries using the active materials which were not subjected to the mechanical grinding (crystalline).

Furthermore, the nickel type active materials for positive electrode exhibited irreversible capacities (capacities ineffective for discharging even within 100% of charging capacities) at first cycles which were larger than those obtained with the active materials for positive electrode containing cobalt or manganese, thereby constituting causes for unbalances in capacity ratios between positive electrodes and negative electrodes after the second cycle, reduction of charging/discharging capacities and shortening of cyclic service lives. By using the active materials for positive electrode which were made amorphous by the mechanical grinding, however, it was possible to reduce the irreversible capacities 10 to 45%, thereby obtaining batteries which had prolonged cyclic service lives and large discharging capacities.

Table 3 lists characteristics of the lithium secondary battery which was manufactured in Example 9 using the lithium-manganese oxide synthesized by the mechanical grinding method in normalization to the lithium secondary battery manufactured in Comparative example 3 manufactured by the calcination method.

TABLE 3

| | Discharging capacity | Cyclic service life | Irreversible capacity at first cycle |
|---|---|---|---|
| Example 9/ Comparative example 3 | 1.16 | 1.4 | 0.8 |

As apparent from Table 4, Example 9 which adopted the mechanical grinding provided results to enlarge a discharging capacity 16% and prolong a cyclic service life 40% as compared with those obtained by the conventional calcination method. Furthermore, Example 9 could reduce an irreversible capacity 20% and provided results more excellent than those obtained by the conventional calcination method. It was found that the mechanical grinding makes it possible to synthesize at room temperature active materials for positive electrode which were conventionally to be calcined at high temperatures and for long times.

Table 4 summarizes evaluation results of the lithium secondary batteries which were manufactured using the active materials for negative electrode which were prepared by the mechanical grinding. Discharging capacities and cyclic service lives are normalized to those of the batteries manufactured in Comparative examples using the active materials which were not treated by the mechanical grinding.

TABLE 4

|  | Discharging capacity | Cyclic service life |
|---|---|---|
| Example 8/ Comparative example 5 | 1.2 | 1.5 |
| Example 12/ Comparative example 6 | 1.1 | 1.3 |
| Example 13/ Comparative example 7 | 1.3 | 1.8 |
| Example 14/ Comparative example 8 | 1.2 | 1.7 |
| Example 16/ Comparative example 9 | 1.15 | 1.4 |

As understood from Table 4, it was found that the mechanical grinding was effective to obtain discharging capacities and cyclic service lives which were 10 to 30% larger and 30 to 80% longer than those available with active materials not treated by the mechanical grinding, thereby improving performance of batteries.

Figure 12:
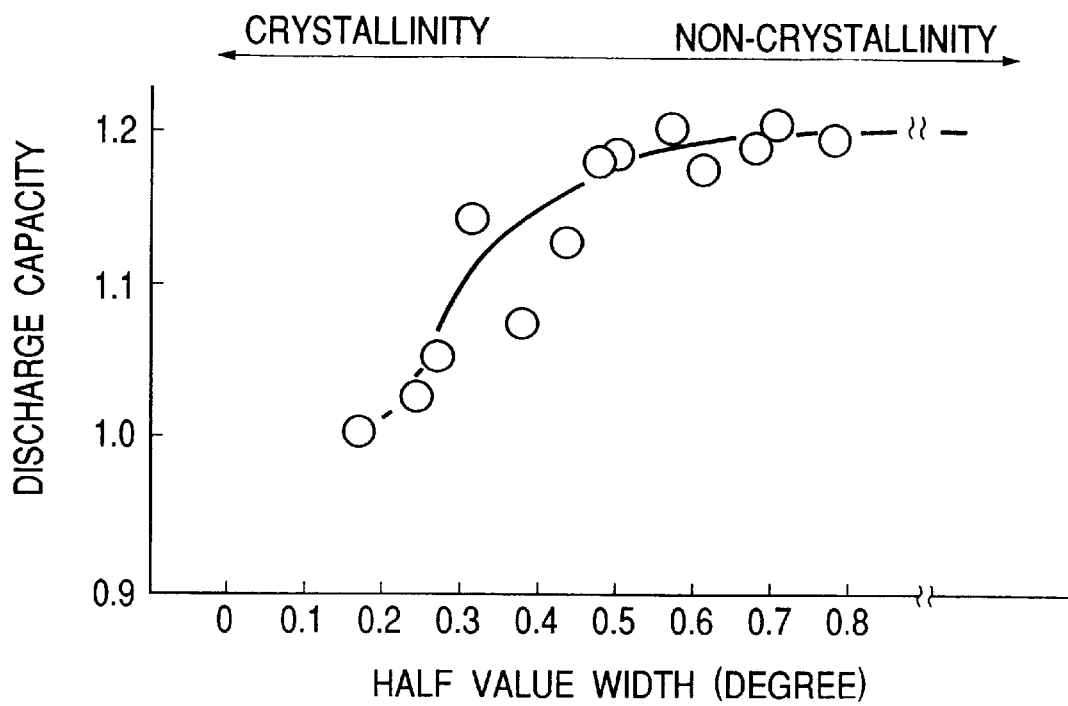
FIG. 12 is a graph showing the relationship between a half value width of an active material and discharge capacity according to the present invention.

FIG. 12 shows relationship between half value widths and discharging capacities of the secondary batteries manufactured in Example 17 (a ratio at a mixing time of 0 is taken as 1.0). From the results shown in FIG. 12, it was found that half value widths were nearly constant at levels not lower than 0.48. Accordingly, it is preferable that active material has half value widths not smaller than 0.48 degree. Furthermore, active materials having half value widths within a range from 0.25 to 0.48 degree also provide discharging capacities which are larger than that obtainable with a crystalline active material having a half value width of 0.17 degree and even an active material which is treated in a mild mechanical grinding condition and has a low non-crystallinity is more effective to enlarge a discharging capacity than a crystalline active material.

Figure 13:
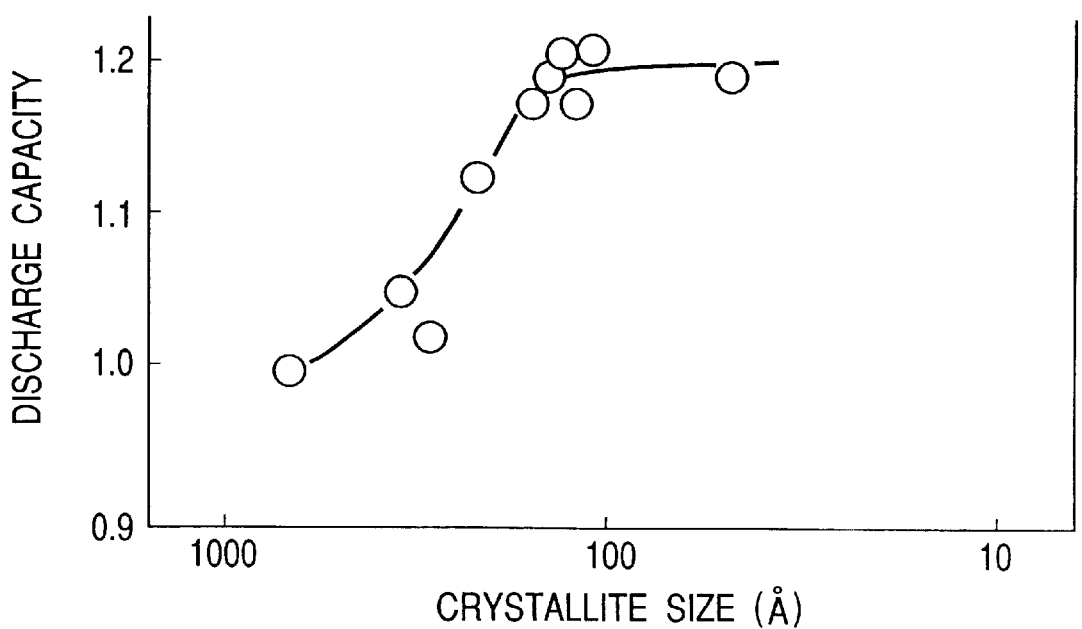
FIG. 13 is a graph showing the relationship between a crystallite size and discharge capacity according to the present invention.

FIG. 13 shows relationship between crystal particle sizes and discharging capacities manufactured in Example 17 (a ratio at a mixing time of 0 is taken as 1.0). The results shown in FIG. 13 clarified that discharging capacities are constant at crystallite sizes not larger than 200 Å. Accordingly, it is preferable that crystal particle sizes are not larger than 200 Å. Even when a crystallite size is large, an active material subjected to the mechanical grinding is more effective to enlarge a discharging capacity than an active material which is not subjected to the mechanical grinding as in the case of the half value widths shown in FIG. 12.

As understood from the foregoing description, the present invention makes it possible to obtain a lithium secondary battery which has a long cyclic service life and a large capacity.

The active materials for positive electrodes which were used in Examples are not limitative and it is possible to use other kinds of active material for positive electrode such as lithium-cobalt oxide and lithium-vanadium oxide. The active materials for negative electrode which were used in Examples are also not limitative and it is possible to adopt various kinds of active materials for negative electrode, for example, carbon such as artificial graphite, a metal such as aluminium which can be alloyed with lithium, a metal which cannot be alloyed with lithium and a compound which can intercalate and deintercalate lithium ions.

Though only a kind of electrolyte was used in Examples 6 and 8 to 17, it is neither limitative of the present invention.

What is claimed is:

1. A lithium secondary battery comprising at least a negative electrode, a positive electrode and an electrolyte, and utilizing oxidation and reduction reactions of lithium ions for charging and discharging, wherein said positive electrode has an active material which has at least an amorphous phase, which exhibits peaks having a half value width not narrower than 0.48 degrees at a highest diffraction intensity at $2\theta$ on an X-ray diffractometric chart traced at a diffraction intensity at an X-ray diffraction angle of $2\theta$, and which is a composite consisting of a (i) material which contains at least one element selected from the group consisting of cobalt, nickel, manganese and iron and (ii) a material which is made electrochemically inactive in the positive electrode during a charging/discharging reaction of the lithium battery and contains carbon or at least one metal having less noble standard electrode potential.

2. A lithium secondary battery comprising at least a negative electrode, a positive electrode and an electrolyte, and utilizing oxidation and reduction reactions of lithium ions for charging and discharging, wherein said negative electrode has an active material which has at least an amorphous phase, which exhibits peaks having a half value width not narrower than 0.48 degrees at a highest diffraction intensity at $2\theta$ on an X-ray diffractometric chart traced at a diffraction intensity at an X-ray diffraction angle of $2\theta$, and which is a composite consisting of (i) a material which contains at least one element selected from the group consisting of cobalt, nickel, manganese and iron and (ii) a material which is electrochemically inactive to substances other than lithium in the negative electrode during a charging/discharging reaction of the lithium battery and contains at least one metal having noble standard electrode potential.

3. The lithium secondary battery according to claim 1 or 2, wherein said active material has a crystallite size not exceeding 200 Å.

4. The lithium secondary battery according to claim 1 or 2, wherein an X-ray diffraction intensity on the (003) surface of said active material is two or more times as high as that on the (104) surface.

5. The lithium secondary battery according to claim 1 or 2, wherein a battery voltage varies curvilinearly relative to a discharging capacity with no plateau region during constant current discharging.

6. The lithium secondary battery according to claim 1 or 2, wherein an open voltage has no plateau region relative to a storage capacity.

7. The lithium secondary battery according to claim 1 or 2, wherein said composite has a structure wherein a surface of the material which contains at least one element selected from the group consisting of cobalt, nickel, manganese and iron and which is in particle form is covered with an electrochemically inert material.

8. The lithium secondary battery according to claim 1, wherein said at least one metal having less noble standard electrode potential is selected from the group consisting of Mg, Al, Mn, Zn, Cr, Cd, Co and Ni.

9. The lithium secondary battery according to claim 2, wherein said at least one metal having noble standard electrode potential is selected from the group consisting of Co, Ni, Sn, Pb, Pt, Ag, Cu and Au.

* * * * *